(12) United States Patent
Liang

(10) Patent No.: US 11,887,618 B2
(45) Date of Patent: Jan. 30, 2024

(54) CALL AUDIO MIXING PROCESSING

(71) Applicant: Tencent Technology (Shenzhen) Company Limited, Guangdong (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 11 days.

(21) Appl. No.: 17/723,316

(22) Filed: Apr. 18, 2022

(65) Prior Publication Data

US 2022/0246162 A1 Aug. 4, 2022

Related U.S. Application Data

(63) Continuation of application No. PCT/CN2020/127660, filed on Nov. 10, 2020.

(30) Foreign Application Priority Data

Mar. 12, 2020 (CN) .......................... 202010168875.8

(51) Int. Cl.
*G10L 21/0364* (2013.01)
*G10L 21/0316* (2013.01)
(Continued)

(52) U.S. Cl.
CPC ........ *G10L 21/0364* (2013.01); *G10L 19/167* (2013.01); *G10L 21/034* (2013.01);
(Continued)

(58) Field of Classification Search
CPC . G10L 21/0364; G10L 21/0316; H04M 3/568
See application file for complete search history.

(56) References Cited

U.S. PATENT DOCUMENTS

| 10,148,912 B1 * | 12/2018 | Oliver ................... H04M 3/563 |
| 2012/0215536 A1 * | 8/2012 | Sehlstedt ................. G10L 25/18 704/246 |
| 2018/0041639 A1 | 2/2018 | Gunawan et al. |

FOREIGN PATENT DOCUMENTS

| CN | 1684143 A | 10/2005 |
| CN | 102226944 A | 10/2011 |

(Continued)

OTHER PUBLICATIONS

International Search Report and Written Opinion for PCT/CN2020/127660, dated Feb. 18, 2021, 13 pages, English translation included.

(Continued)

*Primary Examiner* — Bryan S Blankenagel
(74) *Attorney, Agent, or Firm* — ARENTFOX SCHIFF LLP

(57) ABSTRACT

A call audio mixing processing method is provided. In the method, call audio streams from terminals of call members participating in a call are obtained. Voice analysis is performed on the call audio streams to determine voice activity corresponding to each of the terminals. The voice activity of the terminals indicate activity levels of the call members participating in the call. According to the voice activity of the terminals, respective voice adjustment parameters corresponding to the terminals are determined. According to the respective voice adjustment parameters corresponding to the terminals, the call audio streams of the terminals are adjusted. Further, mixing processing is performed on the adjusted call audio streams to obtain a mixed audio stream.

20 Claims, 10 Drawing Sheets

(51) Int. Cl.
  *H04M 3/56* (2006.01)
  *G10L 19/16* (2013.01)
  *G10L 21/034* (2013.01)
  *G10L 25/18* (2013.01)
  *G10L 25/21* (2013.01)
  *G10L 25/51* (2013.01)
  *G10L 25/84* (2013.01)

(52) U.S. Cl.
  CPC .......... *G10L 21/0316* (2013.01); *G10L 25/18* (2013.01); *G10L 25/21* (2013.01); *G10L 25/51* (2013.01); *G10L 25/84* (2013.01); *H04M 3/568* (2013.01)

(56) References Cited

FOREIGN PATENT DOCUMENTS

| | | |
|---|---|---|
| CN | 106878230 A | 6/2017 |
| CN | 107613151 A | 1/2018 |
| CN | 109413475 A | 3/2019 |
| CN | 111048119 A | 4/2020 |
| WO | 2011098142 A1 | 8/2011 |

OTHER PUBLICATIONS

Supplementary European Search Report for 20924281.7, dated Nov. 18, 2022, 9 pages.
Simon Graf et al: "Features for voice activity detection: a comparative analysis", Eurasip Journal on Advances in Signal Processing, vol. 15, No. 10, Nov. 11, 2015, p. 1-15.

* cited by examiner

CALL AUDIO MIXING PROCESSING

RELATED APPLICATIONS

This application is a continuation of PCT/CN2020/127660, entitled "CALL AUDIO MIXING PROCESSING METHOD AND APPARATUS, STORAGE MEDIUM, AND COMPUTER DEVICE" and filed on Nov. 10, 2020, which claims priority to Chinese Patent Application No. 202010168875.8, entitled "CALL AUDIO MIXING PROCESSING METHOD AND APPARATUS, STORAGE MEDIUM, AND COMPUTER DEVICE" and filed on Mar. 12, 2020. The entire disclosures of the prior applications are hereby incorporated by reference in their entirety.

FIELD OF THE TECHNOLOGY

This application relates to the field of voice processing technologies, including call audio mixing processing method.

BACKGROUND OF THE DISCLOSURE

With the development of computer technologies, voice processing technology has emerged. The voice processing technology is a general term for various processing manners such as voice generation, voice signal analysis, or voice recognition, and is also referred to as a digital voice signal processing technology. The development of the voice processing technology has brought much convenience to people's life and work. For example, users can make a voice call, such as a two-party or multi-party call via a telecommunication network or the Internet. During the voice call, each party uses a terminal for voice access. The terminals send call audio to a mixing module for mixing. Signals after the mixing are then transmitted to the terminals and finally played by speakers and other devices.

However, during an actual call, a speaker often encounters an unsatisfactory call effect with disruptive sounds from different participants and is thereby interrupted. The reason is that ambient noise of the different participants is different and can lead to an unsatisfactory effect after being mixed. Accordingly, in a related solution, improvement is made to a full mixing manner. By using a selective mixing manner, some sounds with low volume or high noise are not mixed at all, to reduce interference with the speaker. This method can achieve certain effects. However, as a route selection policy is generally inflexible, for example, route selection based on volume levels, some participants with relatively high recording capture volume are more likely to be selected, while some participants with relatively low recording volume may not be selected and other participants may not be able to hear the voice of such participants, thereby resulting in low call quality.

SUMMARY

Embodiments of this disclosure include a call audio mixing processing method and apparatus, a non-transitory computer-readable storage medium, and a computer device.

A call audio mixing processing method is provided. Call audio streams from terminals of call members participating in a call are obtained. Voice analysis is performed on the call audio streams to determine voice activity corresponding to each of the terminals. The voice activity of the terminals indicate activity levels of the call members participating in the call. According to the voice activity of the terminals, respective voice adjustment parameters corresponding to the terminals are determined. According to the respective voice adjustment parameters corresponding to the terminals, the call audio streams of the terminals are adjusted. Further, mixing processing is performed on the adjusted call audio streams to obtain a mixed audio stream.

A call audio mixing processing method is provided. A call creation instruction is obtained. According to the call creation instruction, a call created based on the call creation instruction is participated in. A call audio stream generated locally during the call is acquired. The call audio stream is transmitted to a server. A mixed audio stream is received from the server and played back. Voice analysis is performed on call audio streams from terminals of call members participating in the call to determine voice activity corresponding to each of the terminals. The voice activity of the terminals indicate activity levels of the call members participating in the call. The call audio streams of the terminals are adjusted according to respective voice adjustment parameters corresponding to the terminals. The respective voice adjustment parameters corresponding to the terminals are determined based on the voice activity of the terminals. The mixed audio stream is generated based on the adjusted call audio streams.

A call audio mixing processing apparatus including processing circuitry is provided. The processing circuitry is configured to obtain call audio streams from terminals of call members participating in a call. The processing circuitry is configured to perform voice analysis on the call audio streams to determine voice activity corresponding to each of the terminals. The voice activity of the terminals indicate activity levels of the call members participating in the call. The processing circuitry is configured to determine, according to the voice activity of the terminals, respective voice adjustment parameters corresponding to the terminals. The processing circuitry is configured to adjust, according to the respective voice adjustment parameters corresponding to the terminals, the call audio streams of the terminals. Further, the processing circuitry is configured to perform mixing processing on the adjusted call audio streams to obtain a mixed audio stream.

A call audio mixing processing apparatus including processing circuitry is provided. The processing circuitry is configured to obtain a call creation instruction. The processing circuitry is configured to participate in, according to the call creation instruction, a call created based on the call creation instruction. The processing circuitry is configured to acquire a call audio stream generated locally during the call. The processing circuitry is configured to transmit the call audio stream to a server. The processing circuitry is configured to receive and play a mixed audio stream from the server. Voice analysis is performed on call audio streams from terminals of call members participating in the call to determine voice activity corresponding to each of the terminals. The voice activity of the terminals indicate activity levels of the call members participating in the call. The call audio streams of the terminals are adjusted according to respective voice adjustment parameters corresponding to the terminals, the respective voice adjustment parameters corresponding to the terminals being determined based on the voice activity of the terminals. The mixed audio stream is generated based on the adjusted call audio streams.

A non-transitory computer-readable storage medium is provided. The non-transitory computer-readable storage medium storing instructions which when executed by one or more processors, cause the one or more processors to perform any of the call audio mixing processing methods.

A computer device, including a memory and one or more processors, the memory storing a computer-readable instruction, the computer-readable instruction, when being executed by the one or more processors, causing the one or more processors to perform any of the call audio mixing processing methods.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To describe the technical solutions in the embodiments of this disclosure, the following briefly describes the accompanying drawings. The accompanying drawings in the following description show only some embodiments of the present disclosure.

DESCRIPTION OF EMBODIMENTS

To make the objectives, technical solutions, and advantages of this disclosure clearer, the following further describes this disclosure with reference to the accompanying drawings and the embodiments. It is to be understood that the specific embodiments described herein are merely used to explain this disclosure and are not intended to limit the scope of this disclosure.

Figure 1:
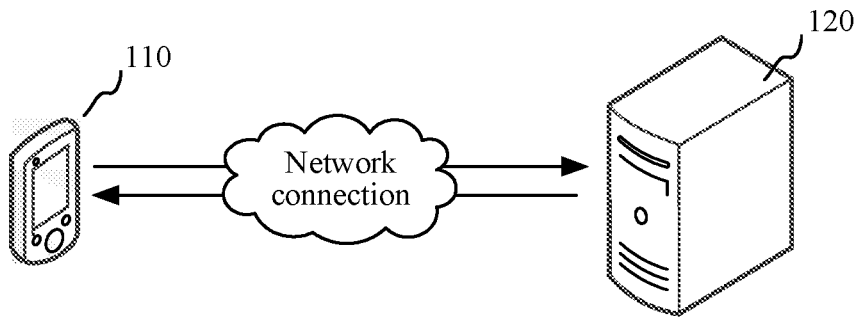
FIG. 1 is an exemplary diagram of an application environment of a call audio mixing processing method according to an embodiment.

FIG. 1 is a diagram of an application environment of a call audio processing method according to an embodiment. Referring to FIG. 1, the call audio processing method is applied to a call audio processing system. The call audio processing system includes a terminal 110 and a server 120. The terminal 110 and the server 120 are connected via a network. The terminal 110 may be specifically a telephone, a desktop terminal, or a mobile terminal, and the mobile terminal may be specifically at least one of a mobile phone, a tablet computer, a notebook computer, and the like. The server 120 may be implemented by using an independent server or a server cluster that includes a plurality of servers. It may be understood that, the terminal 110 in this embodiment of this disclosure may specifically be a terminal corresponding to a call member participating in a call, which may also be referred to as a call member terminal. The terminal 110 may specifically include a first terminal 112 and a second terminal 114. The first terminal may be understood as a terminal initiating a call, and the second terminal may be understood as a terminal receiving the call. The first terminal 112 and the second terminal 114 each establish a voice call link with the server 120 via a network to implement a call. The call may be classified as a two-party call or a multi-party call based on the quantity of participants.

It may be understood that, different users participate in the call via different terminals 110. The terminals 110 upload acquired call audio to the server 120. The server 120 performs voice analysis on the call audio corresponding to the call members participating in the call, determines respective voice activity corresponding to the call members, and determines respective voice adjustment parameters corresponding to the call member terminals according to the voice activity. The server 120 adjusts the corresponding call audio according to the respective voice adjustment parameters corresponding to the call member terminals to obtain adjusted audio, and performs mixing processing on the adjusted audio to obtain a mixed audio. The server 120 may feed back the mixed audio to the terminals 110 corresponding to the call members participating in the call. The terminals 110 may play the mixed audio via speakers after receiving the mixed audio.

Figure 2:
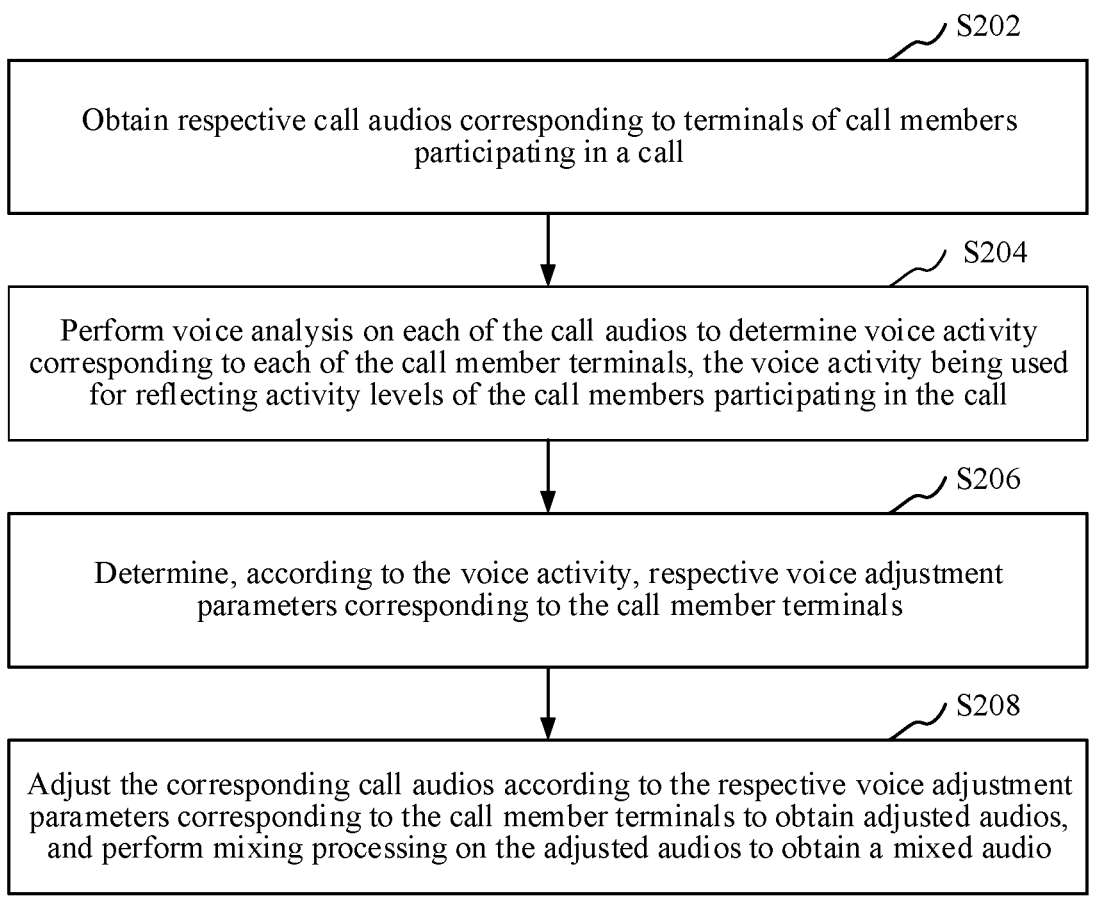
FIG. 2 is an exemplary schematic flowchart of a call audio mixing processing method according to an embodiment.

As shown in FIG. 2, in some embodiments, a call audio processing method is provided. This embodiment is described by using an example in which the method is applied to the server 120 in FIG. 1. Referring to FIG. 2, the call audio processing method specifically includes the following steps:

In step S202, respective call audio corresponding to terminals of call members participating in a call are obtained. For example, call audio streams from terminals of call members participating in a call are obtained.

A call is a way of voice interaction through at least two user identities. A call may be classified as a two-party or a multi-party call depending on the quantity of participating user identities. A call involving only two user identities is a two-party call, and a call involving more than two user identities is a multi-party call. The call may be a group voice call or a group video call. A user identity is used for uniquely identifying a user member, which may be a character string including characters of at least one of the following types: number, letter, and symbol, and may specifically be a user account number, a user cell phone number, or the like. A call member is a user member participating in the call, which may also be referred to as a participant. A call member terminal is a terminal corresponding to the call member participating in the call. A call audio is user voice data acquired through the call member terminal when the call member participates in the call.

Specifically, a call application may be run on the call member terminal, and the call member terminal can realize the function of mutual voice calls between different users through the call application. The call member terminal may acquire, through a sound device (for example, a microphone), voice data generated by a user during the call, generate a call audio accordingly, and transmit the call audio to the server. The server receives call audio transmitted by the terminals of the call members participating in the call. The call application may specifically be an instant messaging client, such as a WeChat client or a QQ client.

In some embodiments, the call member terminals include a first terminal and a second terminal. Call applications are run on the first terminal and the second terminal. The first terminal logs in to the server with a first user identity through the call application, and the second terminal logs in to the server with a second user identity through the call application. The first terminal may initiate a call request through the call application, and the second terminal receives the call request. The user of the second terminal may choose to participate or reject. When the user chooses to participate, the first terminal receives a connection response transmitted by the second terminal in response to the call request and establishes a voice call link. In this way, a call is made between the first terminal and the second terminal.

It may be understood that, the first terminal and the second terminal may make a call through an operator network or an Internet network. The operator network is, for example, a Telecom network, a Mobile network, or a Unicom network. When the terminal is a telephone, the first terminal and the second terminal may make a call based on the operator network. The first terminal and the second terminal may also make a call through the Internet network by means of an installed call application, and in this case, the call may be referred to as a voice over Internet Protocol (VoIP) call.

In step S204, voice analysis is performed on each of the call audio to determine voice activity corresponding to each of the call member terminals, the voice activity being used for reflecting activity levels of the call members participating in the call. For example, voice analysis is performed on the call audio streams to determine voice activity corresponding to each of the terminals. The voice activity of the terminals indicate activity levels of the call members participating in the call.

Voice activity reflects the activity level of a call member participates in a call. Higher voice activity indicates a higher possibility that the call member actually makes a voice, and conversely, lower voice activity indicates a lower possibility that the call member actually makes a voice.

Specifically, after receiving call audio corresponding to the terminals of the call members participating in the call, the server may perform digital voice analysis on the call audio to determine voice activity corresponding to the call audio. It may be understood that, the call audio acquired and uploaded by the call member terminals generally include noise (which may specifically be ambient noise). The server may identify noise and voices (the voices to speaking voices of the call members) from the call audio, and then determine corresponding voice activity by comparing the difference between the voices and noise.

In some embodiments, the server may first calculate signal-to-noise ratios in the call audio when performing voice analysis on the call audio. The signal-to-noise ratio is a signal strength ratio of the speaking voice of the call member and the noise in the call audio, which may be expressed by a logarithm including a ratio of voice signal power to noise power. A higher signal-to-noise ratio represents a higher voice component, which indicates high voice activity, and a higher volume gain needs to be assigned. On the contrary, a low signal-to-noise ratio represents a relatively low probability that a current call audio is a speaking voice of a call member, and a relatively low volume gain is assigned. It may be understood that, the value of the volume gain herein may be a value less than a value one, a value greater than the value one, or the value one.

In some embodiments, the server may directly use the signal-to-noise ratios of the call audio as the corresponding voice activity, or use values obtained by performing linear or non-linear transformation on the signal-to-noise ratios as the corresponding voice activity. For example, the server may use the signal-to-noise ratio times a preset multiplier as the voice activity, or use a logarithm value of the signal-to-noise ratio as the voice activity, or use a value obtained by performing various mathematical operations on the signal-to-noise ratio as the voice activity. This is not limited in the embodiments of this disclosure, as long as the signal-to-noise ratio is positively correlated with the voice activity.

In step S206, according to the voice activity, respective voice adjustment parameters corresponding to the call member terminals are determined. For example, respective voice adjustment parameters corresponding to the terminal are determined according to the voice activity of the terminals.

A voice adjustment parameter is a parameter used for voice gain or attenuation of a call audio. The voice adjustment parameter may specifically be a value less than 1, equal to 1, or greater than 1. Specifically, the server may determine corresponding voice adjustment parameters according to the voice activity of the call audio. Higher voice activity represents a higher voice component in a call audio, and a higher volume gain needs to be assigned, that is, a relatively large voice adjustment parameter is controlled, so that the call audio can obtain a relatively large gain during mixing processing. On the contrary, lower voice activity represents a relatively low possibility that a user makes a voice in the call audio, and a relatively low volume gain is assigned, that is, a relatively small voice adjustment parameter is controlled, so that the call audio can obtain a relatively small gain or the audio is attenuated during mixing processing.

In some embodiments, the server may set an adjustment threshold, that is, when a voice adjustment parameter determined based on voice activity in a certain call audio is less than the adjustment threshold, the voice adjustment parameter of the call audio is set to be the adjustment threshold. That is, lower voice activity indicates a smaller corresponding voice adjustment parameter. The corresponding voice adjustment parameter decreases with the voice activity until the preset adjustment threshold is reached.

In some embodiments, the server may detect and analyze voices of the call audio. Upon detection that there is no human voice or a probability of human voice is low, the corresponding voice activity is relatively low, and therefore a relatively lower volume gain value is configured. Upon detection that a call audio has a clear human voice or a relatively high probability of human voice, the corresponding voice activity is high and therefore a relatively high volume gain value is configured. The volume gain value herein is the voice adjustment parameter.

In step S208, the corresponding call audio are adjusted according to the respective voice adjustment parameters corresponding to the call member terminals to obtain adjusted audio, and perform mixing processing on the adjusted audio to obtain a mixed audio. For example, the call audio streams of the terminals are adjusted according to the respective voice adjustment parameters corresponding to the terminals. Mixing processing is performed on the adjusted call audio streams to obtain a mixed audio stream.

Specifically, the server may adjust, according to the respective voice adjustment parameters corresponding to the call member terminals, the corresponding call audio to obtain corresponding adjusted audio. Further, the server may perform digital signal superimposing processing on the adjusted audio corresponding to the call audio to obtain the mixed audio.

In some embodiments, the server may determine the user identities of the call members participating in the call and feed back the mixed audio to the call member terminals corresponding to the user identities. The corresponding call member terminals may receive the mixed audio and play the mixed audio using devices such as speakers. In this way, the call members may participate in the call by speaking, receiving the mixed audio, and playing the mixed audio.

In some embodiments, after receiving the mixed audio, the call member terminals further perform voice enhancement processing on the mixed audio to make the played mixed audio clearer.

In the foregoing call audio processing method, voice analysis is performed on the call audio corresponding to the terminals of the call members participating in the call to determine the respective voice activity corresponding to the call member terminals. The voice adjustment parameters of the call member terminals are controlled according to the voice activity, so that the adjusted audio are obtained by adjusting the call audio according to the corresponding voice adjustment parameters, and the mixed audio is obtained by performing mixing processing on the adjusted audio. In this way, by using a voice-activity-based voice modulation mechanism, the interference of ambient noise of an inactive user with an active user during the call can be reduced, so that a call member with low voice activity interferes as little as possible with a call member with relatively high activity, and the overall call effect and quality are improved. Moreover, the number of final participants in mixing is not limited during the mixing processing, to avoid the problem that call members exceeding the number of participants to be selected cannot "produce a voice", thereby furthering improves the call quality effectively.

In some embodiments, to ensure the transmission efficiency and security of voice data, voice data may be encoded before being transmitted between the call member terminals and the server, to improve the transmission efficiency and security of the voice data.

Figure 3:
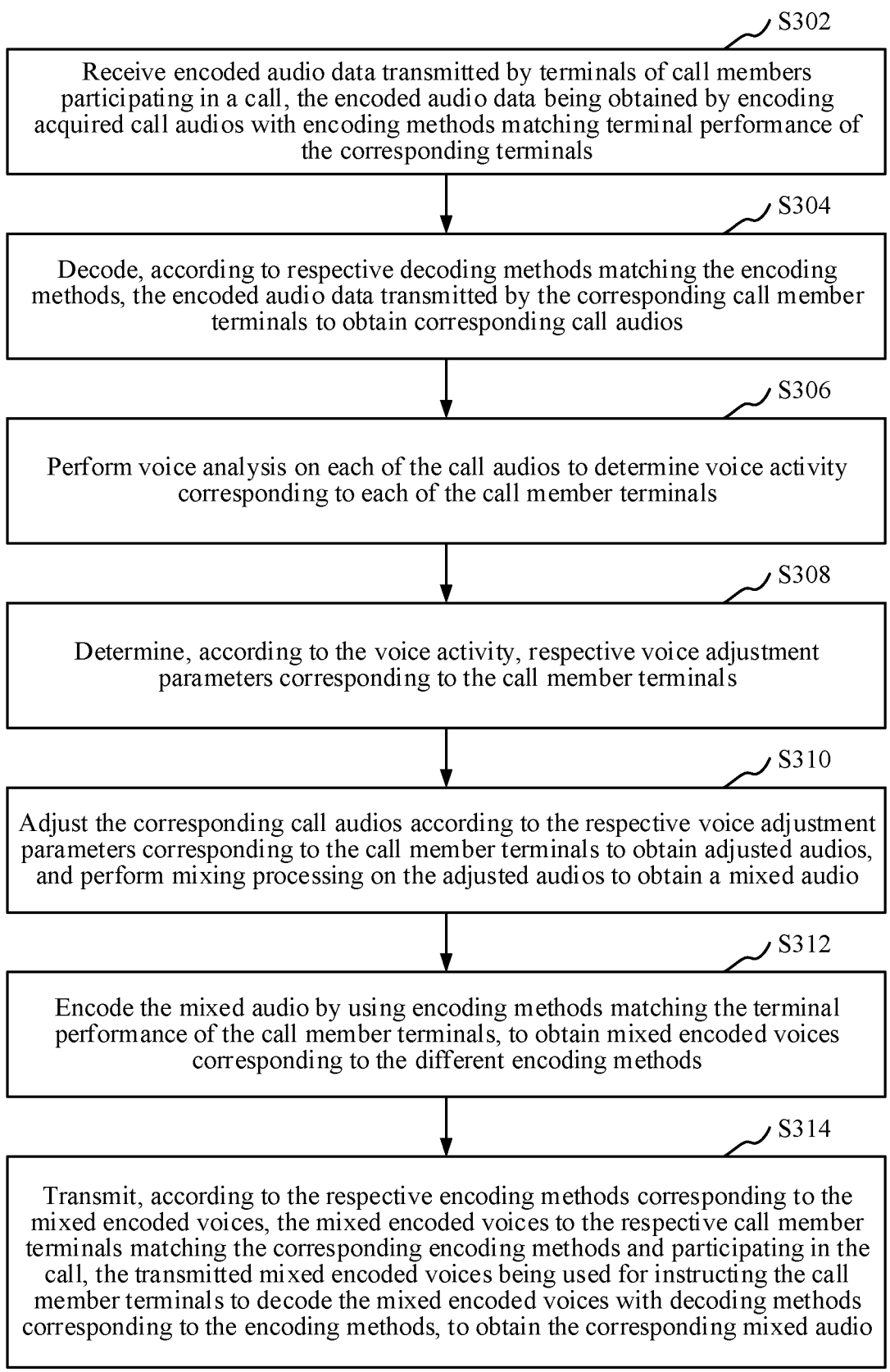
FIG. 3 is an exemplary schematic flowchart of a call audio mixing processing method according to another embodiment.

Referring to FIG. 3, in some embodiments, the call audio processing method specifically includes the following steps:

In step S302, encoded audio data transmitted by terminals of call members participating in a call are received, the encoded audio data being obtained by encoding acquired call audio with encoding methods matching terminal performance of the corresponding terminals.

Specifically, the call member terminals may acquire audio data generated by the call members during the call, and encode the acquired call audio by using the encoding methods matching the terminal performance of the call member terminals to obtain the encoded audio data. The terminal performance is the software capability and hardware capability of a terminal, and determines the maximum processing capability of the terminal. The software capability of the terminal is the capability of specific software or algorithms supported by the terminal, and the hardware capability of the terminal may specifically be the capability related to the central processing unit (CPU) and memory of the terminal. The encoding method matching the terminal performance may specifically be an encoding method corresponding to an encoding format supported by the terminal or an encoding method corresponding to a code stream format supported by the terminal.

In some embodiments, the call member terminal and the server may pre-determine an encoding method and a decoding method that match each other, and the encoding method matches the terminal performance. Further, the call member terminal may encode the call audio according to the preset encoding method to obtain the encoded audio data.

In some embodiments, the encoding method adopted by the terminal may specifically be pulse code modulation (PCM) coding, parametric coding, hybrid coding, or the like, which is not limited in the embodiments of this disclosure.

In step S304, according to respective decoding methods matching the encoding methods, the encoded audio data transmitted by the corresponding call member terminals are decoded to obtain corresponding call audio.

Specifically, when receiving the encoded audio data transmitted by the call member terminals, the server may decode the encoded audio data using corresponding decoding methods to obtain corresponding call audio.

In some embodiments, when the call member terminals adopt the pre-determined encoding methods to encode the call audio, correspondingly, the server may adopt the corresponding decoding methods for decoding. When the calling member terminals adopt the encoding methods matching the performance thereof for encoding, the encoding method identifiers may be sent to the server. The server determines the corresponding decoding methods based on the encoding method identifiers, so as to decode the encoded audio data to obtain the call audio. In this way, the transmission of the call audio by encoding and decoding can greatly improve the transmission efficiency and security of the call audio.

In step S306, voice analysis is performed on each of the call audio to determine voice activity corresponding to each of the call member terminals.

In step S308, according to the voice activity, respective voice adjustment parameters corresponding to the call member terminals are determined.

In step S310, the corresponding call audio are adjusted according to the respective voice adjustment parameters corresponding to the call member terminals to obtain adjusted audio, and perform mixing processing on the adjusted audio to obtain a mixed audio.

In step S312, the mixed audio is encoded by using encoding methods matching the terminal performance of the call member terminals, to obtain mixed encoded voices corresponding to the different encoding methods.

Specifically, after mixing the call audio corresponding to the different terminals to obtain the mixed audio, the server may encode the mixed audio by using encoding methods matching the terminal performance of the call member terminals, to obtain mixed encoded voices corresponding to the different encoding methods.

In step S314, according to the respective encoding methods corresponding to the mixed encoded voices, the mixed encoded voices are transmitted to the respective call member terminals matching the corresponding encoding methods and participating in the call, the transmitted mixed encoded voices being used for instructing the call member terminals to decode the mixed encoded voices with decoding methods corresponding to the encoding methods, to obtain the corresponding mixed audio.

Specifically, the server may transmit, according to the respective encoding methods corresponding to the mixed encoded voices, the mixed encoded voices to the call member terminals matching corresponding encoding methods and participating in the call respectively. Further, the call member terminals may decode the mixed encoded voices with decoding methods corresponding to the encoding methods, to obtain the corresponding mixed audio.

It may be understood that, for a call member terminal, the server may encode the mixed audio by using the encoding method adopted by the call member terminal, to obtain a mixed encoded voice, and feed back the mixed encoded voice to the call member terminal. Definitely, the server may also encode the mixed audio by using another encoding method, but the corresponding call member terminal is capable of decoding the mixed encoded voice obtained by using the encoding method. This is not limited in the embodiments of this disclosure.

In the foregoing embodiment, during the transmission of the call audio and mixed audio, the call member terminals and the server encode the transmitted voice data separately before transmission, which can greatly improve the efficiency and security of voice data transmission.

Figure 4:
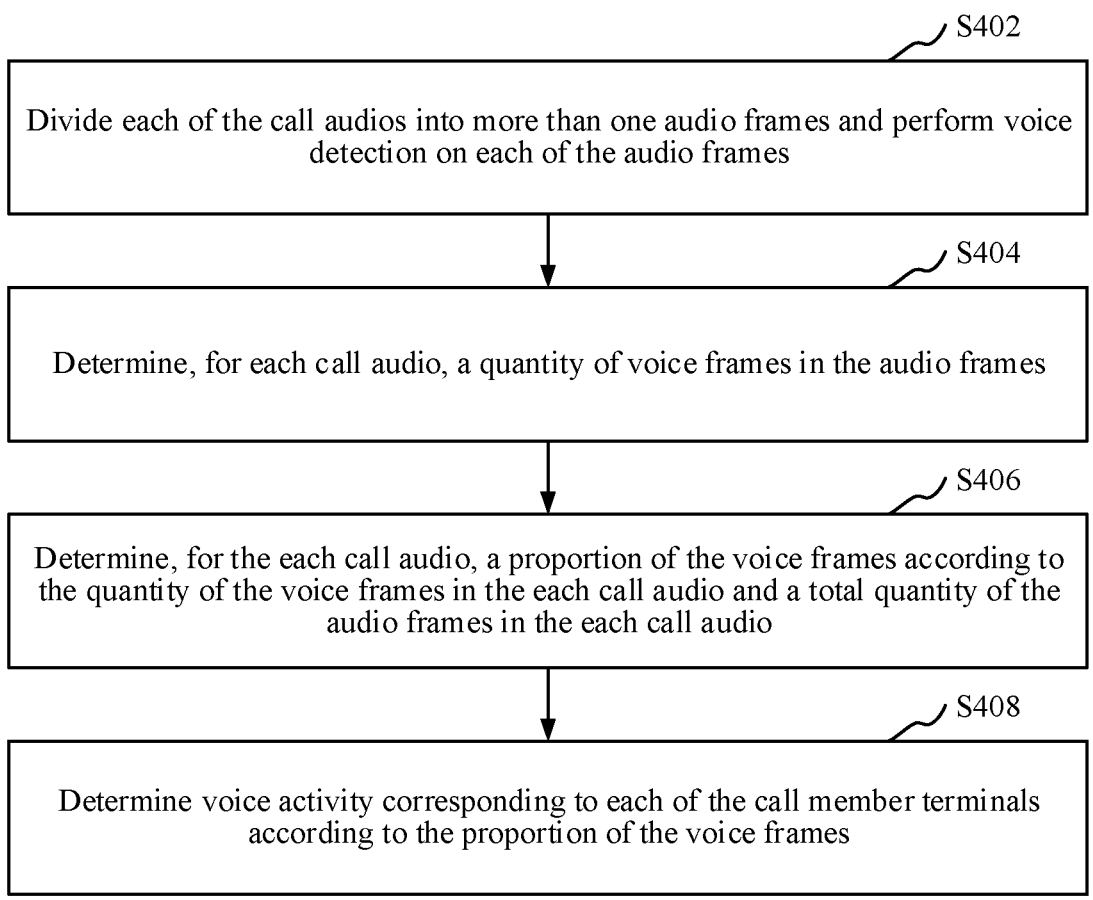
FIG. 4 is an exemplary schematic flowchart of a step of performing voice analysis on call audio to determine respective voice activity corresponding to call member terminals according to an embodiment.
Figure 5:
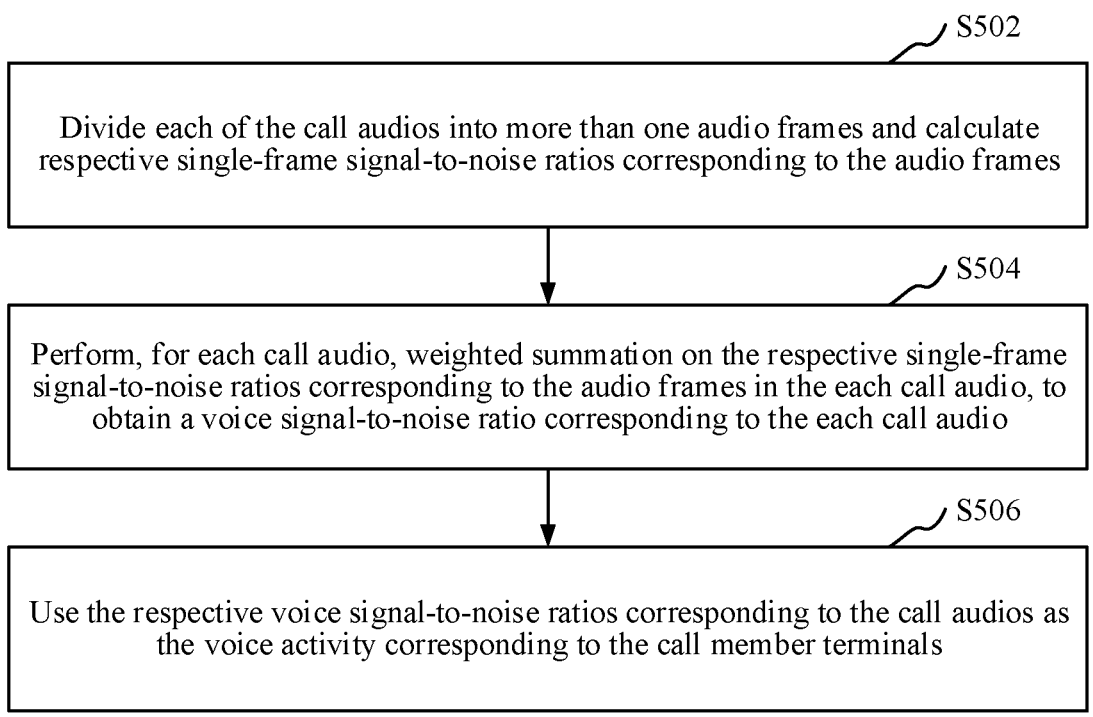
FIG. 5 is an exemplary schematic flowchart of a step of performing voice analysis on call audio to determine respective voice activity corresponding to call member terminals according to an embodiment.
Figure 6:
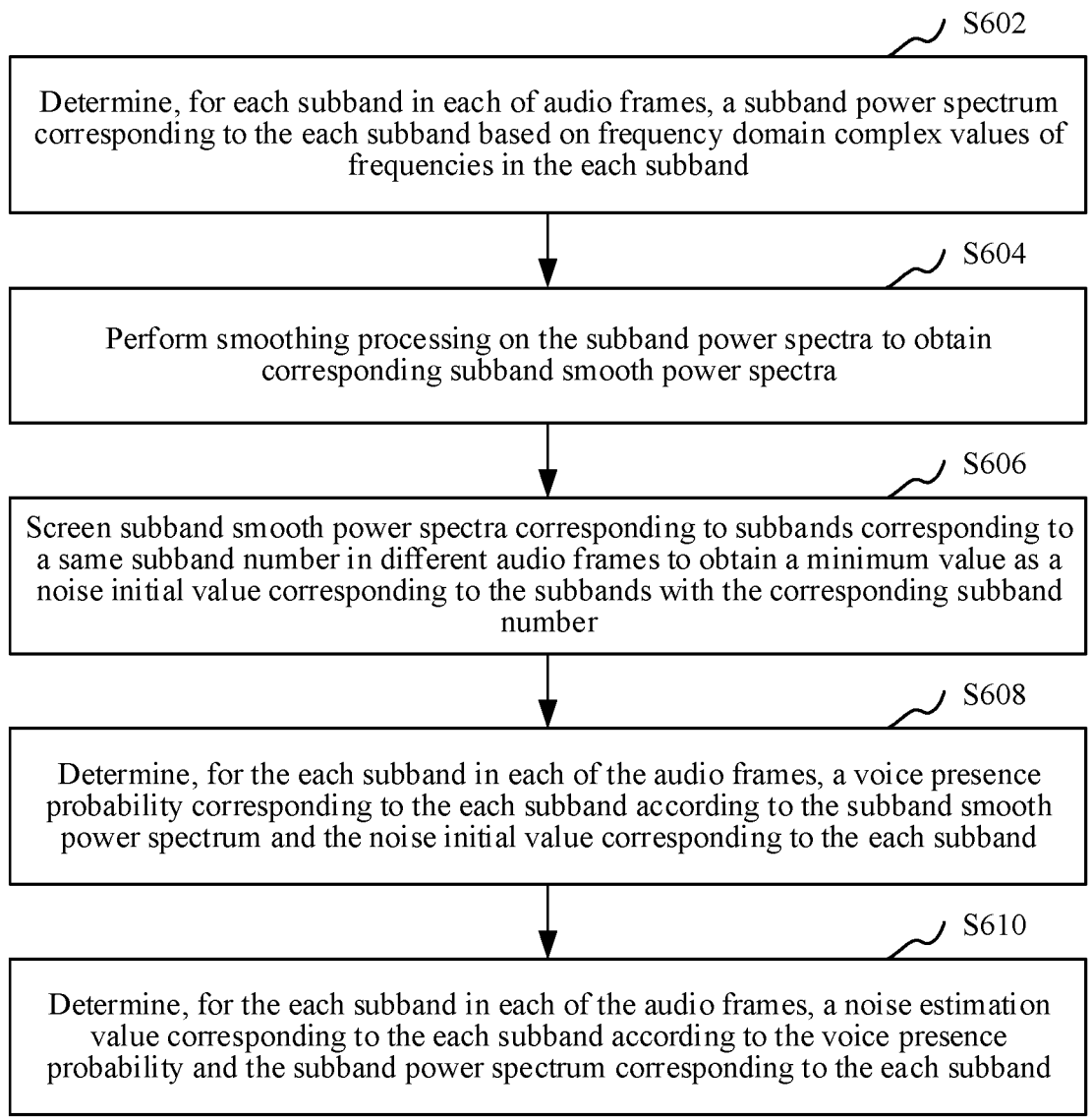
FIG. 6 is an exemplary schematic flowchart of a step of calculating, for subbands in each of audio frames, subband power spectra and noise estimation values corresponding to the subbands according to an embodiment.

Referring to FIG. 4, in some embodiments, Step S204, that is, the step of performing voice analysis on each of the call audio to determine voice activity corresponding to each of the call member terminals specifically includes the following steps:

In step S402, each of the call audio are divided into more than one audio frames and perform voice detection on each of the audio frames.

An audio frame is the smallest processing unit of a call audio, and is a call audio per unit time. Specifically, for each call audio, the server may perform frame division on the each call audio according to an acquisition sequence of the call audio, divide the each call audio into more than one audio frames, and further perform voice detection on each audio frame.

In some embodiments, in order to make the transition between adjacent audio frames smooth and maintain continuity, the server may use an overlapping segmentation manner to divide each call audio into audio frames. In this case, an overlapping part between two adjacent frames may be referred to as a frame shift, and a ratio of the frame shift to a frame size is generally 0 to 0.5. Definitely, the server may also directly divide each call audio into more than one audio frames based on a fixed duration, which is not limited in the embodiments of this disclosure.

In some embodiments, the server may use a voice activity detection (VAD) algorithm to process each audio frame to determine whether the each audio frame is a voice or non-voice frame, that is, whether a human voice is present in the each audio frame.

In step S404, for each call audio, a quantity of voice frames in the audio frames is determined.

Specifically, for each call audio, the server may count a quantity of voice frames with a human voice in the each call audio, that is, the quantity of voice frames in the each call audio.

In step S406, for the each call audio, a proportion of the voice frames is determined according to the quantity of the voice frames in the each call audio and a total quantity of the audio frames in the each call audio.

Specifically, for the each call audio, the server may divide the quantity of the voice frames in the each call audio by the total quantity of the audio frames in the each call audio to obtain the proportion of the voice frames in the each call audio.

In step S408, voice activity corresponding to each of the call member terminals is determined according to the proportion of the voice frames.

Specifically, for each call audio, the server may directly use the proportion of the voice frames corresponding to the each call audio as the corresponding voice activity. Alternatively, the server may perform certain mathematical operations on the proportion of the voice frames to obtain the corresponding voice activity, which is positively correlated with the proportion of the voice frames. That is, a higher proportion of voice frames in a call audio indicates higher voice activity corresponding to the call audio, and a lower proportion of voice frames in a call audio indicates lower voice activity corresponding to the call audio. It may be understood that, a larger quantity of voice frames indicates that a corresponding call member is making a voice effectively, that is, the call member is active in the call.

In the foregoing embodiment, voice detection is performed on audio frames within a certain period to identify whether the audio frames are voice frames. Further, voice activity corresponding to the call audio may be accurately and quickly determined according to the proportions of the voice frames, thereby quantifying the voice activity of the call members.

In some embodiments, Step S204, that is, the step of performing voice analysis on each of the call audio to determine voice activity corresponding to each of the call member terminals specifically includes: dividing each of the call audio into more than one audio frames and performing voice detection on each of the audio frames; determining voice frames in the audio frames and determining energy values corresponding to the voice frames; and determining the voice activity corresponding to each of the call member terminals according to a quantity of valid voice frames with energy values greater than or equal to an energy threshold in the voice frames in each of the call audio.

Specifically, the server may perform frame division on the call audio according to an acquisition sequence of the call audio, divide each of the call audio into more than one audio frames, and further perform voice detection on each of the audio frames. If a human voice is detected in an audio frame, the audio frame is a voice frame. For each call audio, the server may determine voice frames in the each call audio and determine energy values corresponding to the voice frames. The server may count a quantity of valid voice frames with energy values greater than or equal to an energy threshold in the voice frames in each of the call audio, and determine the voice activity corresponding to each of the call member terminals according to the quantity. The energy value corresponding to each of the voice frames may specifically be a power value of the voice frame, and the energy value corresponding to the voice frame may be a sum of subband power spectra of subbands in the voice frame. For the specific calculation of the subband power spectra, reference may be made to the descriptions of the embodiments below. The energy threshold is a threshold, determined based on an actual situation, for determining whether a voice frame is a valid voice frame.

It may be understood that, for an audio frame, even if a human voice is detected in the audio frame and the audio frame is confirmed as a voice frame, it is still possible that the human voice present in the audio frame is a background voice, that is, noise rather than a real speech. Therefore, voice frames with energy values greater than the energy threshold are used as valid voice frames, so that noise is effectively filtered out, thus making the voice activity determined based on the valid voice frames more accurate.

In some embodiments, when determining the voice activity corresponding to each of the call audio, the server may count the valid voice frames in each of the call audio to obtain a corresponding quantity. The calculation is then performed on the quantity based on a preset function to obtain the corresponding voice activity. The voice activity is positively correlated with the quantity of the valid voice frames, that is, a larger quantity of valid voice frames indicates higher voice activity, and a smaller quantity of valid voice frames indicates lower voice activity. The preset function is, for example, a multiplication function, a power function, a combined function of a plurality of operations, or the like.

In the foregoing embodiment, the voice frames in the audio frames are detected, and the voice frames with energy values greater than the energy threshold are used as the valid voice frames, so that noise can be effectively eliminated from the audio frames, thus making the voice activity determined based on the valid voice frames more accurate.

In some embodiments, Step S204, that is, the step of performing voice analysis on each of the call audio to determine voice activity corresponding to each of the call member terminals specifically includes the following steps:

In step S502, each of the call audio is divided into more than one audio frames and calculate respective single-frame signal-to-noise ratios corresponding to the audio frames.

Specifically, for each call audio, the server may perform frame division on the each call audio according to an acquisition sequence of the call audio, divide the each call audio into more than one audio frames, and further calculate respective single-frame signal-to-noise ratios corresponding to the audio frames. A single-frame signal-to-noise ratio is a signal-to-noise ratio corresponding to a single audio frame.

In some embodiments, when calculating the respective single-frame signal-to-noise ratio corresponding to each audio frame, the server may first convert the each audio frame from time domain space to frequency domain space through a fast Fourier transform to obtain a corresponding spectrum diagram, which are also referred to as a voice spectrum. Further, the server may calculate a power spectrum of the each audio frame according to the amplitude corresponding to frequencies in the voice spectrum. The server may obtain a minimum power value in the frequency spectrum corresponding to the each audio frame by using a minimal tracking manner, and use the minimum power value as an estimation value of noise in the each audio frame. Further, the single-frame signal-to-noise ratio of the each audio frame is calculated according to a ratio of the power spectrum to the estimation value of the noise.

In step S504, for each call audio, weighted summation is performed on the respective single-frame signal-to-noise ratios corresponding to the audio frames in the each call audio, to obtain a voice signal-to-noise ratio corresponding to the each call audio.

Specifically, for each call audio, the server may perform weighted summation on the respective single-frame signal-to-noise ratios corresponding to the audio frames in the each call audio, to obtain a voice signal-to-noise ratio corresponding to the each call audio. The voice signal-to-noise ratio is a signal-to-noise ratio corresponding to the call audio. Weight coefficients of the weighted summation may specifically be set according to the actual situation. For example, the weight coefficients of first few frames are relatively large and the weight coefficients of later few frames are relatively small. Alternatively, each frame corresponds to the same weight coefficient. This is not limited in the embodiments of this disclosure.

In step S506, the respective voice signal-to-noise ratios corresponding to the call audio are used as the voice activity corresponding to the call member terminals.

Specifically, the server may directly use the respective voice signal-to-noise ratios corresponding to the call audio as the voice activity corresponding to the call member terminals.

In some embodiments, the server may also perform linear or non-linear transformation on the voice signal-to-noise ratios to obtain the corresponding voice activity. The voice activity is positively correlated with the voice signal-to-noise ratios. That is, a higher voice signal-to-noise ratio indicates a higher probability of the presence of a voice, and thus indicates higher corresponding voice activity.

In the foregoing embodiment, each call audio is divided into more than one audio frames, and the voice signal-to-noise ratio of the each call audio is determined according to the single-frame signal-to-noise ratios corresponding to the audio frames. In this way, the voice signal-to-noise ratios may be used as the corresponding voice activity, and the voice signal-to-noise ratios can accurately reflect the voice activity corresponding to the call members.

In some embodiments, Step S204, that is, the step of performing voice analysis on each of the call audio to determine voice activity corresponding to each of the call member terminals specifically includes: dividing each of the call audio into more than one audio frames and calculating respective single-frame signal-to-noise ratios corresponding to the audio frames. Step S206, that is, the step of determining, according to the voice activity, respective voice adjustment parameters corresponding to the call member terminals specifically includes: determining, for each call audio, respective voice adjustment parameters corresponding to the audio frames in the each call audio based on the respective single-frame signal-to-noise ratios corresponding to the audio frames. The step of adjusting the corresponding call audio according to the respective voice adjustment parameters corresponding to the call member terminals to obtain adjusted audio specifically includes: adjusting, for each call audio, the audio frames in the each call audio according to the respective voice adjustment parameters corresponding to the audio frames, to obtain the adjusted audio corresponding to the call member terminal; and performing mixing processing on the respective adjusted audio corresponding to the call members to obtain a mixed audio.

That is, the call audio processing method specifically includes the following steps: obtaining respective call audio corresponding to terminals of call members participating in a call; dividing each of the call audio into more than one audio frames and calculating respective single-frame signal-to-noise ratios corresponding to the audio frames; determining, for each call audio, respective voice adjustment parameters corresponding to the audio frames in the each call audio based on the respective single-frame signal-to-noise ratios corresponding to the audio frames; adjusting, for the each call audio, the audio frames in the each call audio according to the respective voice adjustment parameters corresponding to the audio frames, to obtain an adjusted audio corresponding to the call member terminal; performing mixing processing on the respective adjusted audio corresponding to the call member terminals to obtain a mixed audio; and feeding back the mixed audio to the call members participating in the call.

Specifically, the server may divide each of the call audio into more than one audio frames and calculate respective single-frame signal-to-noise ratios corresponding to the audio frames. Further, for each call audio, the server may determine respective voice adjustment parameters corresponding to the audio frames in the each call audio based on the respective single-frame signal-to-noise ratios corresponding to the audio frames. That is, the voice adjustment parameters of the call audio are determined with audio frames as units. For example, the call audio includes five audio frames. In this case, respective single-frame signal-to-noise ratios of the five audio frames determine respective voice adjustment parameters of the five frames.

Further, for each call audio, the server performs voice adjustment on the voice frames in the each call audio according to the respective voice adjustment parameters corresponding to the audio frames, to obtain an adjusted audio corresponding to the call member. That is, for a call audio, the server may make adaptive adjustment to audio frames in the call audio. For example, gain processing is performed on a signal of an audio frame with a high single-frame signal-to-noise ratio and a signal of an audio frame with a low single-frame signal-to-noise ratio is attenuated, so as to adjust the call audio by using each frame as a unit, to obtain an adjusted audio. Further, the server may perform digital signal superimposing processing on the respective adjusted audio corresponding to the call members to obtain the mixed audio.

In the foregoing embodiment, each call audio is divided into smaller audio frames, and voice adjustment parameters corresponding to the frames are determined by using each single frame as a unit, so that voice adjustment is separately performed on the audio frames to obtain a corresponding adjusted audio. Further, the adjusted audio are mixed to obtain a mixed audio. The call audio are adjusted in a finer and more precise manner, so that the mixed audio has higher quality.

In some embodiments, Step S206, that is, the step of determining, according to the voice activity, respective voice adjustment parameters corresponding to the call member terminals specifically includes: screening the voice activity corresponding to the call member terminals to obtain a maximum voice activity value; and determining, according to comparison values between the voice activity corresponding to the call member terminals and the maximum voice activity value, the respective voice adjustment parameters corresponding to the call member terminals, the respective voice adjustment parameters corresponding to the call member terminals being negatively correlated with corresponding comparison values.

Specifically, the server may screen the voice activity corresponding to the call member terminals to obtain a maximum voice activity value. Further, the server may determine, according to comparison values between the voice activity corresponding to the call member terminals and the maximum voice activity value, the respective voice adjustment parameters corresponding to the call member terminals. The voice adjustment parameters corresponding to the call member terminals are negatively correlated with corresponding comparison values. That is, a larger comparison value indicates a smaller corresponding voice adjustment parameter, and a smaller comparison value indicates a larger corresponding voice adjustment parameter. A comparison value is a difference between two values, which may specifically be determined through a mathematical calculation. The mathematical calculation is, for example, direct division of two numbers, division following logarithmic operation, subtraction, division following logarithmic operation after another operation, or the like. The comparison value may measure a difference state of one numerical value relative to another numerical value.

In some embodiments, the server may separately calculate the comparison values between the voice activity corresponding to the call member terminals and the maximum voice activity value, and then perform calculation on the comparison values based on a preset function to obtain the corresponding voice adjustment parameters. The voice adjustment parameters are negatively correlated with the comparison values. That is, a greater difference between voice activity corresponding to a call audio and the maximum voice activity value indicates a smaller corresponding voice adjustment parameter; and a smaller difference between the voice activity corresponding to a call audio and the maximum voice activity value indicates a larger corresponding voice adjustment parameter. It may be understood that, a call audio with highest voice activity corresponds to the largest voice adjustment parameter. The preset function is, for example, a subtraction function, a division function, a combined function of a plurality of operations, or the like.

In the foregoing embodiment, for the call audio corresponding to the terminals of the call members participating in the call, a relatively large voice adjustment parameter is set for a call audio with relatively high voice activity. In this way, the interference of noise with the participating members can be reduced and the effect of voice mixing is improved.

In some embodiments, the step of dividing each of the call audio into more than one audio frames and calculating respective single-frame signal-to-noise ratios corresponding to the audio frames specifically includes: for the respective call audio corresponding to each call member terminal, dividing the corresponding call audio into more than one audio frames located in time domain space; converting audio frames from the time domain space to frequency domain space to obtain corresponding voice spectra, and determining more than one subbands in each of the respective voice spectra corresponding to the audio frames; calculating, for the subbands in each of the audio frames, respective subband power spectra and noise estimation values corresponding to the subbands, and determining respective subband signal-to-noise ratios corresponding to the subbands based on the subband power spectra and the noise estimation values; and calculating the respective single-frame signal-to-noise ratio corresponding to each of the audio frames according to the respective subband signal-to-noise ratios corresponding to the subbands in each of the audio frames.

Specifically, the server may convert the audio frames from the time domain space to the frequency domain space through a fast Fourier transform to obtain corresponding spectrum diagrams, which are also referred to as the voice spectra. Further, the server may divide each of the voice spectra into more than one subbands according to a preset fixed frequency band. The subband is also referred to as a sub-frequency band.

Further, the server calculates, for the subbands in each of the audio frames, subband power spectra and noise estimation values corresponding to the subbands, and determines respective subband signal-to-noise ratios corresponding to the subbands based on the subband power spectra and the noise estimation values. Further, for each audio frame, the server may average the subband signal-to-noise ratios corresponding to the subbands in the each audio frame to obtain the single-frame signal-to-noise ratio corresponding to the each audio frame. The specific calculation of the subband power spectra and noise estimation values corresponding to the subbands is described in detail in the embodiments below.

In some embodiments, the server may calculate the single-frame signal-to-noise ratios corresponding to the audio frames by using the following formula:

$$SNR(i, k) = \frac{S(i, k)}{\hat{S}_n(i, k)},$$

where S(i,k) represents a subband power spectrum of a $k^{th}$ subband in an $i^{th}$ audio frame, and $\hat{S}_n$(i,k) represents a noise estimation value of the $k^{th}$ subband in the $i^{th}$ audio frame. The single-frame signal-to-noise ratio of the $i^{th}$ audio frame may be calculated by using the following formula:

$$\text{Snr\_frame}(i) = \frac{1}{N}\sum_{k=1}^{N} SNR(i, k),$$

that is, an average value of the signal-to-noise ratios of all the subbands is calculated to obtain the single-frame signal-to-noise ratio of the current frame.

In the foregoing embodiment, by converting the audio frames from time domain space to frequency domain space for processing, the subband signal-to-noise ratios corresponding to the subbands in the audio frames can be more easily and accurately determined, thereby determining the single-frame signal-to-noise ratios based on the subband signal-to-noise ratios.

In some embodiments, the step of calculating, for the subbands in each of the audio frames, respective subband power spectra and noise estimation values corresponding to the subbands includes the following steps:

In step S602, for each subband in each of the audio frames, the subband power spectrum corresponding to the each subband is determined based on frequency domain complex values of frequencies in the each subband.

Specifically, for each subband in each of the audio frames, the server may determine frequency domain complex values of amplitudes of frequencies in the each subband according to the voice spectrum, and further average the frequency domain complex values of all the frequencies in the each subband to obtain the subband power spectrum corresponding to the each subband.

In some embodiments, the subband power spectrum of the subband may be calculated by using the following formula:

$$S(i, k) = \frac{1}{(freq_2(k) - freq_1(k) + 1)} \sum_{z=freq_1(k)}^{freq_2(k)} |X(i, z)|^2,$$

where k=1, 2, 3, . . . , N. i corresponds to a frame number, z corresponds to a frequency number, which is also referred to as a frequency index value, and k corresponds to a subband number. S(i,k) represents a subband power spectrum of a $k^{th}$ subband in an $i^{th}$ audio frame. X(i, z) is a frequency domain complex value of a $z^{th}$ frequency of the $i^{th}$ frame after a Fourier transform; $freq_1$(k) is a start frequency index value of the $k^{th}$ subband, and $freq_2$(k) is an end frequency index value of the $k^{th}$ subband.

In step S604, smoothing processing is performed on the subband power spectra to obtain corresponding subband smooth power spectra.

Specifically, for each subband in an audio frame, the server performs frequency domain smoothing processing on adjacent subbands and time domain smoothing processing on historical frames for the subband power spectrum of the subband to obtain a corresponding subband smooth power spectrum.

In some embodiments, the performing smoothing processing on the subband power spectra to obtain corresponding subband smooth power spectra includes: determining, for a current subband in a current frame currently processed in the audio frames, a preset quantity of adjacent subbands adjacent to the current subband in the current frame; combining the adjacent subbands and the current subband to form a subband sequence; performing weighted summation, according to weights corresponding to the subband sequence, on the subband power spectra of the subbands in the subband sequence to obtain a frequency domain smooth power spectrum corresponding to the current subband in the current frame; and performing weighted summation on a frequency domain smooth power spectrum of a historical subband corresponding to a same subband number with the current subband in a frame previous to the current frame and the frequency domain smooth power spectrum of the current subband in the current frame, to obtain a subband smooth power spectrum corresponding to the current subband in the current frame.

Specifically, the server may first perform frequency domain smoothing processing on the subband power spectrum, specifically by determining a preset quantity of adjacent subbands adjacent to the current subband in the current frame, where the adjacent subbands may be historical frames previous to the current frame, and/or, subsequent frames after the current frame. For example, the previous two frames and the subsequent two frames of the current frame. Further, the server combines the adjacent subbands and the current subband to form a subband sequence. According to weights corresponding to the subband sequence, weighted summation is performed on subband power spectra of the subbands in the subband sequence to obtain a frequency domain smooth power spectrum corresponding to the current subband in the current frame.

In some embodiments, the server may calculate the frequency domain smooth power spectrum of the current subband by using the following formula:

$$\overline{S}_f(i, k) = \frac{1}{2w+1} \sum_{j=-w}^{w} b(j + w)S(i, k + j),$$

where $\overline{S}_f$(i,k) represents a frequency domain smooth power spectrum of a $k^{th}$ subband in an $i^{th}$ audio frame; 2w+1 is a quantity of subbands in the subband sequence, and b(j+w) is a set of frequency domain smoothing weight factors, for example, when w=2, b(j+w) may specifically be [0.1, 0.2, 0.4, 0.2, 0.1].

Further, the server may perform time domain smoothing processing on the current subband in the current frame based on a frequency domain smooth power spectrum of a historical subband with a same subband number as the current subband in a historical frame. It may be understood that, the historical frame may be specifically one historical frame or more than one historical frames. When the quantity of historical frames is 1, the historical frame may specifically be a previous voice frame or an $N^{th}$ voice frame previous to the current frame, where N is a positive integer greater than 1.

In some embodiments, the server may calculate the subband smoothing power spectrum of the current subband by using the following formula: $\overline{S}(i,k)=c_0\overline{S}(i-1,k)+(1-c_0)S_f(i,k)$; where, $c_0$ is a time domain smoothing factor, for example, $c_0=0.9$.

It may be understood that, after processing the current subband of the current frame, the server continues processing a next subband until the subband smooth power spectra corresponding to all the subbands in the current frame are calculated. Further, a next voice frame is processed until the respective subband smooth power spectra corresponding to the subbands in each of the voice frames in each call audio are calculated. The server may process different call audio at the same time or one by one. The processing is repeated until respective subband smooth power spectra corresponding to the subbands in each of the voice frames in each of the call audio are calculated.

In step S606, subband smooth power spectra corresponding to subbands with a same subband number in different audio frames is screened to obtain a minimum value as a noise initial value corresponding to the subbands with the corresponding subband number.

Specifically, the server may screen subband smooth power spectra corresponding to subbands with a same subband number in different audio frames to obtain a minimum value as a noise initial value corresponding to the subbands with the corresponding subband number.

In some embodiments, the server may set a comparison period. Within a comparison period, the server may screen audio frames in the period, and use a minimum value in subband smooth power spectra corresponding to subbands with a same subband number as a noise initial value corresponding to the subbands with the same subband number. Further, screening is performed in a next period and a minimum value among different periods is selected as an ultimate noise initial value corresponding to the subbands.

In some embodiments, a computer device may determine the noise initial value by
if(mod(i,T)=0)
$S_{min}(i,k)=min(S_{tmp}(i-1,k),\overline{S}(i,k))$;
$S_{tmp}(i,k)=\overline{S}(i,k)$;
using the following algorithm: else
$S_{min}(i,k)=min(S_{tmp}(i-1,k),\overline{S}(i,k))$;
$S_{tmp}(i,k)=min(S_{tmp}(i-1,k),\overline{S}(i,k))$;
end
where T is a constant representing a noise estimation value update period, that is, the comparison period. mod(i, T) is a complementation operation. $S_{min}(i,k)$ represents a noise initial value corresponding to a $k^{th}$ subband in an $i^{th}$ frame; and $S_{tmp}(i,k)$ is a noise temporary value in the process of solving the noise initial value.

In step S608, for the each subband in each of the audio frames, a voice presence probability corresponding to the each subband is determined according to the subband smooth power spectrum and the noise initial value corresponding to the each subband.

Specifically, for each subband in each of the audio frames, the server may directly use a ratio of the subband smooth power spectrum to the noise initial values corresponding to the each subband as a voice presence probability corresponding to the each subband, or may perform linear transformation on the ratio of the subband smooth power spectrum to the noise initial value to obtain the corresponding voice presence probability.

In some embodiments, Step S608, that is, the step of determining, for the each subband in each of the audio frames, a voice presence probability corresponding to the each subband according to the subband smooth power spectrum and the noise initial value corresponding to the each subband includes: for a current subband in a current frame currently processed in the audio frames, using a quotient of a subband smooth power spectrum and a noise initial value of the current subband as a power ratio corresponding to the current subband in the current frame; using a first value as a voice presence value corresponding to the current subband in the current frame when the power ratio is greater than a preset threshold; using a second value as the voice presence value corresponding to the current subband in the current frame when the power ratio is less than or equal to the preset threshold, the second value being less than the first value; obtaining, in a historical frame previous to the current frame, a voice presence probability of a historical subband corresponding to a same subband number with the current subband; and determining a voice presence probability corresponding to the current subband in the current frame according to the voice presence probability corresponding to the historical subband and the voice presence value corresponding to the current subband.

Specifically, for a current subband in a current frame currently processed in the audio frames, the server may use a quotient of a subband smooth power spectrum and a noise initial value of the current subband as a power ratio corresponding to the current subband in the current frame. A first value is used as a voice presence value corresponding to the current subband in the current frame when the power ratio is greater than a preset threshold. A second value is used as the voice presence value corresponding to the current subband in the current frame when the power ratio is less than or equal to the preset threshold. The first value may be specifically 1 and the second value may be specifically 0. In this way, when the power ratio exceeds the threshold, it is considered that a voice is present, and when the power ratio is less than or equal to the threshold, it is considered that no voice is present. Alternatively, the first value may be set to 0.9 and the second value may be set to 0.1, or other values satisfying the condition that the first value is greater than the second value may be set according to the actual situation. This is not limited in the embodiments of this disclosure.

Further, the server may obtain a voice presence probability of a historical subband corresponding to a same subband number with the current subband in a historical frame previous to the current frame; and determine, by combining the voice presence probability corresponding to the historical subband and the voice presence value corresponding to the current subband, a voice presence probability corresponding to the current subband in the current frame. Specifically, weighted summation, logarithmic operation following multiplying, or another mathematical operation may be performed on the voice presence probability corresponding to the historical subband and the voice presence value corresponding to the current subband, to obtain the voice presence probability corresponding to the current subband in the current frame. In this way, a high misjudgment rate due to a high power ratio caused by ambient noise can be avoided, and a misjudgment may be counteracted by the voice presence value. In addition, the voice presence probability of the current frame is determined with reference to the historical frames, so that the historical data is fully considered to improve the calculation accuracy.

It may be understood that, for each subband in each of the audio frames, the corresponding voice presence probability is calculated in the same manner until the voice presence probabilities corresponding to all the subbands in the audio frames are obtained.

In some embodiments, the computer device may calculate the voice presence probability corresponding to the current subband in the current frame by using the following formula:

$$S_r(i, k) = \overline{S}(i, k)/S_{min}(i, k);$$

$$p(i, k) = \begin{cases} 1, S_r(i, k) > \delta \\ 0, S_r(i, k) \leq \delta \end{cases}$$

$$\hat{p}(i, k) = \alpha_p \hat{p}(i-1, k) + (1 - \alpha_p)p(i, k)$$

$S_r(i,k)$ represents a power ratio corresponding to a $k^{th}$ subband in a $i^{th}$ frame, $\overline{S}(i,k)$ represents a subband smooth power spectrum of the $k^{th}$ subband in the $i^{th}$ frame, and $S_{min}(i,k)$ represents a noise initial value of the $k^{th}$ subband in the $i^{th}$ frame. $p(i,k)$ represents a voice presence value corresponding to the $k^{th}$ subband in the $i^{th}$ frame, $\hat{p}(i,k)$ represents a voice presence probability corresponding to the $k^{th}$ subband in the $i^{th}$ frame, and $\alpha_p$ is a weight coefficient, which takes a value between 0 and 1, for example, 0.6 or 0.8.

In the foregoing embodiment, the power ratio is gated to determine the presence of voice. In this way, a high misjudgment rate due to a high power ratio caused by ambient noise can be avoided and the misjudgment can be counteracted by the voice presence value. In addition, the voice presence probability of the current frame is determined with reference to the historical frame, so that the historical data is fully considered to improve the calculation accuracy.

In step S610, for the each subband in each of the audio frames, a noise estimation value corresponding to the each subband is determined according to the voice presence probability and the subband power spectrum corresponding to the each subband.

In some embodiments, for the each subband in each of the audio frames, the server may use a difference between a value one and the voice presence probability as a noise presence probability corresponding to the each subband, and use a product of the subband power spectrum and the noise presence probability as a noise estimation value corresponding to the each subband.

In some embodiments, Step S610, that is, the step of determining, for the each subband in each of the audio frames, a noise estimation value corresponding to the each subband according to the voice presence probability and the subband power spectrum corresponding to the each subband includes: using a difference between a value one and the voice presence probability as a noise presence probability corresponding to the each subband; obtaining, for a current subband in a current frame currently processed in the audio frames, a noise estimation value corresponding to a historical subband corresponding to a same subband number with the current subband in a historical frame of the current frame; and summing a first product of the noise estimation value corresponding to the historical subband and the voice presence probability corresponding to the current subband in the current frame and a second product of a subband power spectrum and a noise presence probability corresponding to the current subband in the current frame, to obtain a noise estimation value corresponding to the current subband in the current frame.

In some embodiments, the server may use differences between a value one and the voice presence probabilities as noise presence probabilities corresponding to the subbands. For a current subband in a current frame currently processed in the audio frames, a noise estimation value corresponding to a historical subband corresponding to a same subband number with the current subband in a historical frame of the current frame is obtained. The server may multiply the noise estimation value corresponding to the historical subband by the voice presence probability corresponding to the current subband in the current frame to obtain a first product. The subband power spectrum and the noise presence probability corresponding to the current subband in the current frame are multiplied to obtain a second product. The first product and the second product are summed to obtain a noise estimation value corresponding to the current subband in the current frame. The noise estimation value corresponding to the historical subband corresponding to the same subband number with the current subband in the historical frames of the current frame obtained by the server may specifically be a noise estimation value corresponding to a historical subband corresponding to the same subband number with the current subband in an $N^{th}$ (N is a positive integer greater than or equal to 1) frame previous to the current frame.

In some embodiments, the computer device may calculate the noise estimation value corresponding to the current subband in the current frame by using the following formula: $\hat{S}_n(i,k)=\hat{p}(i,k)\hat{S}_n(i-1,k)+(1-\hat{p}(i,k))S(i,k)$; where $\hat{S}_n(i,k)$ represents a noise estimation value corresponding to a $k^{th}$ subband in an $i^{th}$ frame; $\hat{p}(i,k)$ represents a voice presence probability corresponding to the $k^{th}$ subband in the $i^{th}$ frame; $\hat{S}_n(i-1,k)$ represents a noise estimation value corresponding to a $k^{th}$ subband in an $(i-1)^{th}$ frame; and $S(i,k)$ represents a subband power spectrum corresponding to the $k^{th}$ subband in the $i^{th}$ frame.

In the foregoing embodiment, the noise estimation value corresponding to each of the subbands in the current frame is determined with reference to the noise estimation values of the historical frames, so that the continuity of sound in time can be fully considered to improve the estimation accuracy.

In some embodiments, the step of determining, for each call audio, respective voice adjustment parameters corresponding to the audio frames in the each call audio based on the respective single-frame signal-to-noise ratios corresponding to the audio frames includes: calculating, for a current frame currently processed in the audio frames of the each call audio, a corresponding instant voice adjustment parameter based on a single-frame signal-to-noise ratio corresponding to the current frame; determining a historical voice adjustment parameter corresponding to a historical frame previous to the current frame; determining a voice adjustment parameter corresponding to the current frame according to the historical voice adjustment parameter and the instant voice adjustment parameter corresponding to the current frame; and further processing a subsequent frame after the current frame until the respective voice adjustment parameters corresponding to the audio frames are obtained.

Specifically, for a current frame currently processed in the audio frames of each call audio, the server may calculate a corresponding instant voice adjustment parameter based on a single-frame signal-to-noise ratio corresponding to the current frame. A historical voice adjustment parameter corresponding to a historical frame previous to the current frame is determined, and according to the historical voice adjustment parameter and the instant voice adjustment parameter corresponding to the current frame, a voice adjustment parameter corresponding to the current frame is determined.

In some embodiments, the server may fuse the historical voice adjustment parameter with the instant voice adjustment parameter corresponding to the current frame, to obtain the voice adjustment parameter corresponding to the current frame. The fusion manner may be specifically fusion by mathematical operation, which is not limited in the embodiments of this disclosure. For example, the server may perform weighted summation on the historical voice adjustment parameter and the instant voice adjustment parameter corresponding to the current frame, to obtain the voice adjustment parameter corresponding to the current frame. For another example, the server may perform multiplying following logarithm operation on the historical voice adjustment parameter and the instant voice adjustment parameter corresponding to the current frame, to obtain the voice adjustment parameter corresponding to the current frame. For each frame in the call audio, the server uses the same manner to calculate the voice adjustment parameter corresponding to the each voice frame to obtain the respective voice adjustment parameters corresponding to the audio frames.

In some embodiments, the computer device may calculate the voice adjustment parameter corresponding to the current frame by using the following formula:

$$\text{gain}(i)=\beta*\text{gain\_inst}(i)+(1-\beta)*\text{gain}(i-1);$$

where, gain(i) represents a voice adjustment parameter corresponding to an $i^{th}$ audio frame; gain(i−1) represents a voice adjustment parameter corresponding to an $(i-1)^{th}$ audio frame; gain_inst(i) represents an instant voice adjustment parameter corresponding to the $i^{th}$ audio frame; and $\beta$ is a weight factor, for example, 0.3.

In some embodiments, the calculating, for a current frame currently processed in the audio frames of the each call audio, a corresponding instant voice adjustment parameter based on a single-frame signal-to-noise ratio corresponding to the current frame includes: determining a maximum signal-to-noise ratio and a minimum signal-to-noise ratio from the single-frame signal-to-noise ratios corresponding to the audio frames in the each call audio; determining a first difference according to a difference between the maximum signal-to-noise ratio and the minimum signal-to-noise ratio; determining, for the current frame currently processed in the audio frames of the each call audio, a second difference according to a difference between the single-frame signal-to-noise ratio corresponding to the current frame and the minimum signal-to-noise ratio; and determining the instant voice adjustment parameter corresponding to the current frame according to a preset minimum gain value, the first difference, and the second difference.

In some embodiments, the computer device may calculate the instant voice adjustment parameter corresponding to the current frame by using the following formula:

$$\text{gain\_inst}(i) = \min\left\{1, G_{min} + \max\left[0, \frac{10*\log_{10}\text{Snr\_frame}(i) - \text{MinSnrDB}}{\text{MaxSnrDB} - \text{MinSnrDB}} *(1-G_{min})\right]\right\};$$

where $G_{min}$ is a preset minimum voice adjustment parameter; MaxSnrDB and MinSnrDB are respectively a maximum signal-to-noise ratio and a minimum signal-to-noise ratio in dB, which may be set according to the actual application scenario; and Snr_frame(i) represents a single-frame signal-to-noise ratio of an $i^{th}$ frame.

In the foregoing embodiment, the corresponding voice adjustment parameters may be determined based on the single-frame signal-to-noise ratios corresponding to the audio frames, and the voice adjustment parameters may be guaranteed to increase as the single-frame signal-to-noise ratios increase and decrease as the single-frame signal-to-noise ratios decrease until the voice adjustment parameters decrease to the preset minimum voice adjustment parameter. In this way, a call member with low voice activity interferes as little as possible with a call member with relatively high activity, thereby improving the overall call effect and quality.

Figure 7:
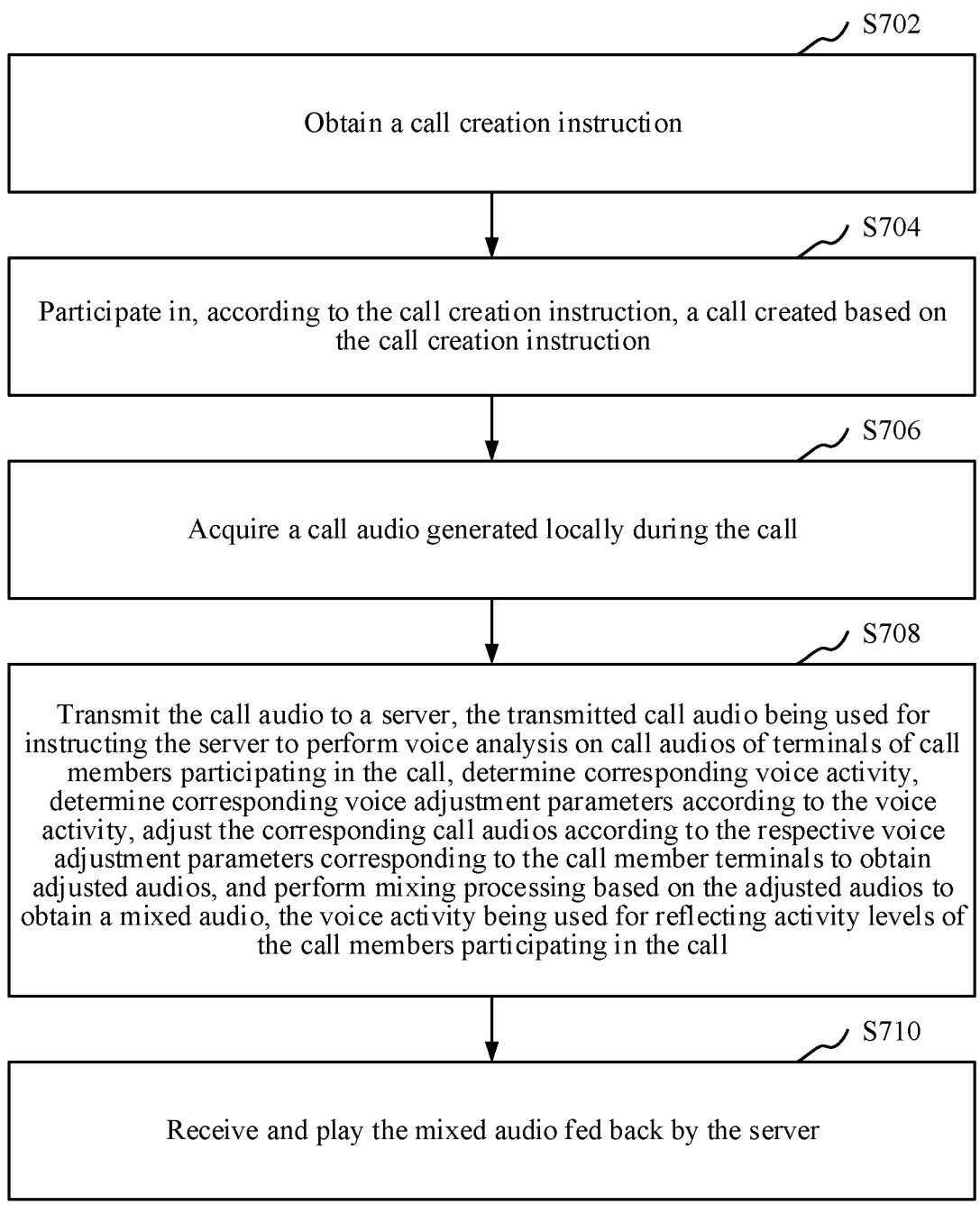
FIG. 7 is an exemplary flowchart of a call audio mixing processing method according to another embodiment.

As shown in FIG. 7, in some embodiments, a call audio mixing processing method is provided. In this embodiment, descriptions are provided mainly by using an example in which the method is applied to the terminal 110 (also referred to as a call member terminal) in FIG. 1. Referring to FIG. 7, the call audio mixing processing method specifically includes the following steps:

In step S702, obtain a call creation instruction.

A call creation instruction is an instruction used for creating a call. Specifically, the member terminal includes a first terminal and a second terminal. For the first terminal, the first terminal may actively trigger a call creation instruction via a call application and based on a user's operation, and send the call creation instruction to the second terminal. The first terminal establishes a communication link with the second terminal when receiving an acceptance response from the second terminal. For the second terminal, the second terminal may receive the call creation instruction from the first terminal and make the acceptance response to establish a call link with the first terminal.

In step S704, participate in, according to the call creation instruction, a call created based on the call creation instruction.

Specifically, both the first terminal and the second terminal may participate in a corresponding call according to the established call link.

In step S706, acquire a call audio generated locally during the call.

Specifically, when a call member speaks, the call member terminal may acquire, via a sound acquiring device, a call audio generated by the call member while participating in the call.

In step S708, transmit the call audio to a server, the transmitted call audio being used for instructing the server to perform voice analysis on call audio of terminals of call members participating in the call, determine corresponding voice activity, determine corresponding voice adjustment parameters according to the voice activity, adjust the corresponding call audio according to the respective voice adjustment parameters corresponding to the call member terminals to obtain adjusted audio, and perform mixing processing based on the adjusted audio to obtain a mixed audio, the voice activity being used for reflecting activity levels of the call members participating in the call.

Specifically, both the first terminal and the second terminal may send the acquired call audio to the server so that the server may process the call audio to obtain a mixed audio. Reference may be made to the descriptions of the foregoing embodiments for how the server processes the call audio to obtain the mixed audio, and details are not described again in this embodiment of this disclosure.

In some embodiments, Step S708, that is, the step of transmitting the call audio to a server includes: performing voice enhancement processing on the call audio, the voice enhancement processing including at least one of voice noise cancellation processing, echo cancellation processing, and voice volume adjustment processing; and transmitting the call audio to the server after the voice enhancement processing.

In some embodiments, the call member terminal may send the acquired call audio to the server after voice enhancement processing. The voice enhancement processing includes at least one of voice noise cancellation processing, echo cancellation processing, and voice volume adjustment processing, which can improve the voice quality of the transmitted call audio. The voice noise cancellation processing is reduction of noise content in the call audio, for example, noise cancellation processing through a suppression algorithm. Echo cancellation is elimination of echoes in the call audio, which may be implemented using, for example, acoustic echo cancellation (AEC) and line echo cancellation (LEC) technologies. Voice volume adjustment processing may specifically be increasing the volume of the call audio. In this way, the voice quality of the call audio sent to the server can be improved to reduce the processing load on the server.

In some embodiments, the call member terminal may send a voice-enhanced call audio to the server after encoding. Reference may be made to the descriptions of the foregoing embodiments for the specific encoding method and the decoding method of the server, which are not described in detail herein.

In step S710, receive and play the mixed audio fed back by the server.

Specifically, both the first terminal and the second terminal participating in the call may receive the mixed audio fed back by the server and play the mixed audio via a speaker.

In some embodiments, the server may feed back the mixed audio after encoding. That is, the call member terminal receives the mixed encoded voice fed back by the server. The call member terminal may use a corresponding decoding method to decode the mixed encoded voice to obtain the corresponding mixed audio.

In the foregoing call audio processing method, the call audio generated by the call members participating in the call are acquired and reported to the server, and the server performs voice analysis on the call audio corresponding to the terminals of the call members participating in the call to determine the respective voice activity corresponding to the call member terminals. The server controls the voice adjustment parameters of the call members according to the voice activity, so as to obtain the adjusted audio by adjusting the call audio according to the corresponding voice adjustment parameters, mix the adjusted audio, and feed back the mixed audio to the call member terminals for playing. In this way, by using a voice-activity-based voice modulation mechanism, the interference of ambient noise of an inactive user with an active user during the call can be reduced, so that a call member with low voice activity interferes as little as possible with a call member with relatively high activity, and the overall call effect and quality are improved. Moreover, the number of final participants in mixing is not limited during the mixing processing, to avoid the problem that call members exceeding the number of participants to be selected cannot "produce a voice", thereby furthering improves the call quality effectively.

Figure 8:
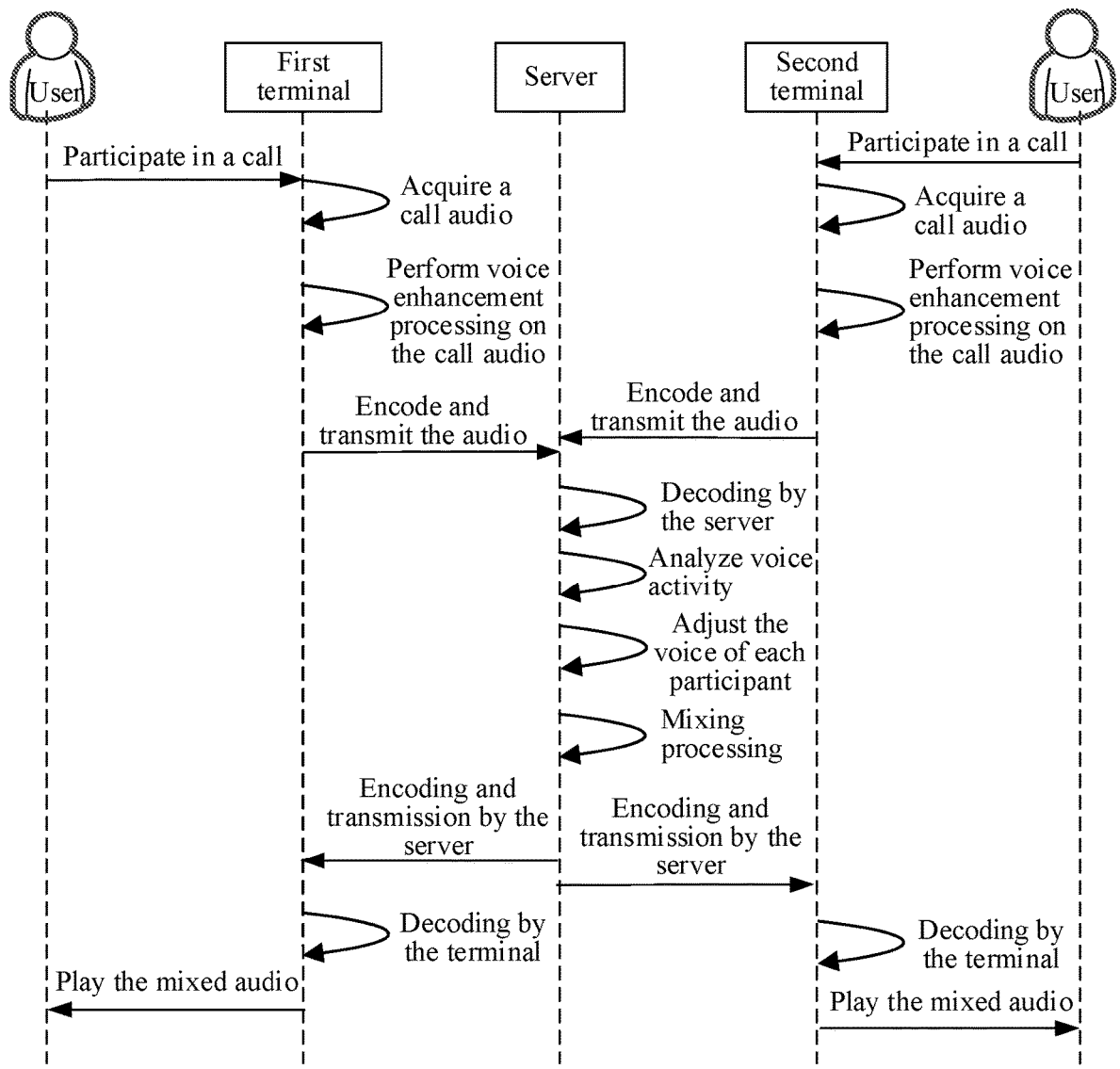
FIG. 8 is an exemplary sequence diagram of a call audio mixing processing method according to an embodiment.

Referring to FIG. 8, FIG. 8 is a sequence diagram of a call audio processing method according to an embodiment. As shown in FIG. 8, different users participate in a call through a first terminal and a second terminal respectively. The first terminal and the second terminal respectively acquire the corresponding call audio and perform voice enhancement processing. The first terminal and the second terminal respectively perform audio encoding on the voice-enhanced call audio and transmit to the server. The server decodes the received call audio and analyzes voice activity, so as to adjust the voice of each participant, and finally performs mixing processing to obtain a mixed audio. The server transmits the mixed audio to the corresponding first terminal and second terminal after audio encoding, and the first terminal and the second terminal decode and play the mixed audio respectively.

FIG. 8 is a schematic flowchart of a call audio processing method according to an embodiment. It is to be understood that, although each step of the flowcharts in FIG. 8 is displayed sequentially according to arrows, the steps are not necessarily performed according to an order indicated by arrows. Unless otherwise explicitly specified in this disclosure, execution of the steps is not strictly limited, and the steps may be performed in other sequences. In addition, at least some steps in FIG. 8 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

Figure 9A:
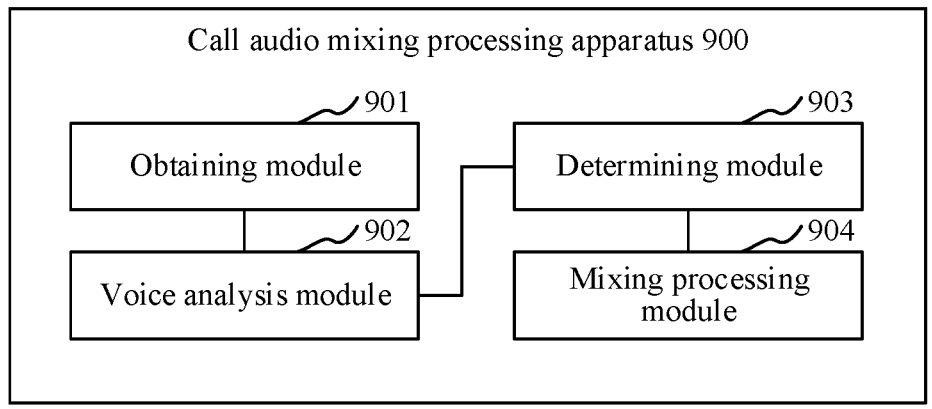
FIG. 9(a) is an exemplary structural block diagram of a call audio mixing processing apparatus according to an embodiment.

As shown in FIG. 9(a), in some embodiments, a call audio mixing processing apparatus 900 is provided, including an obtaining module 901, a voice analysis module 902, a determining module 903, and a mixing processing module 904. One or more modules, submodules, and/or units of the apparatus can be implemented by processing circuitry, software, or a combination thereof, for example.

The obtaining module 901 is configured to obtain call audio transmitted by terminals of call members participating in a call.

The voice analysis module 902 is configured to perform voice analysis on each of the call audio to determine voice activity corresponding to each of the call member terminals, the voice activity being used for reflecting activity levels of the call members participating in the call.

The determining module 903 is configured to determine, according to the voice activity, respective voice adjustment parameters corresponding to the call member terminals.

The mixing processing module 904 is configured to adjust, according to the respective voice adjustment parameters corresponding to the call member terminals, the corresponding call audio to obtain adjusted audio, and perform mixing processing on the adjusted audio to obtain a mixed audio.

In some embodiments, the obtaining module 901 is further configured to receive encoded audio data transmitted by the terminals of the call members participating in the call, the encoded audio data being obtained by encoding acquired call audio with encoding methods matching terminal performance of the corresponding terminals; and decode, according to respective decoding methods matching the encoding methods, the corresponding encoded audio data transmitted by the call member terminals to obtain the corresponding call audio.

Figure 9B:
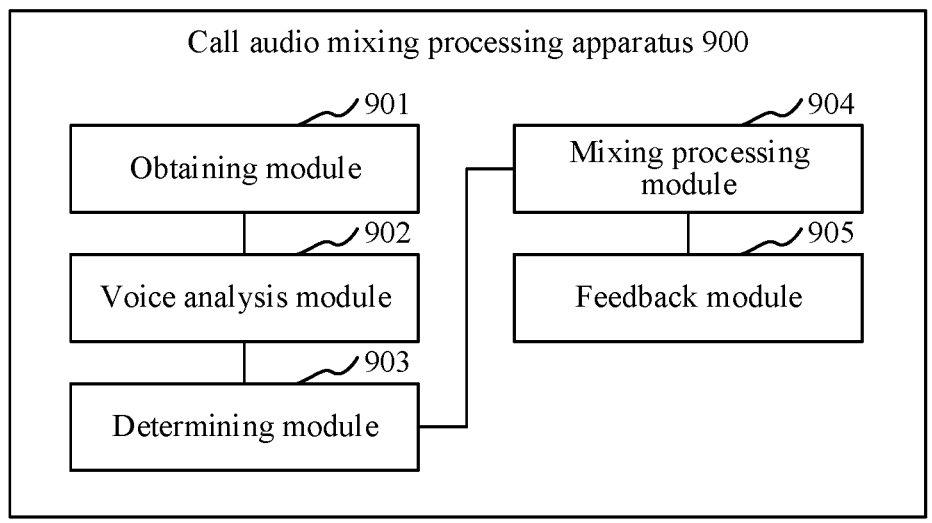
FIG. 9(b) is an exemplary structural block diagram of a call audio mixing processing apparatus according to still another embodiment.

Referring to FIG. 9(b), in some embodiments, the call audio mixing processing apparatus 900 further includes a feedback module 905, configured to encode the mixed audio by using encoding methods matching the terminal performance of the call member terminals, to obtain mixed encoded voices corresponding to the different encoding methods; and transmit, according to the respective encoding methods corresponding to the mixed encoded voices, the mixed encoded voices to the respective call member terminals matching the corresponding encoding methods and participating in the call, the transmitted mixed encoded voices being used for instructing the call member terminals to decode the mixed encoded voices by using decoding methods corresponding to the encoding methods, to obtain the corresponding mixed audio.

In some embodiments, the voice analysis module 902 is further configured to divide each of the call audio into more than one audio frames and perform voice detection on each of the audio frames; determine a quantity of voice frames in the audio frames in each of the call audio; determine, for each call audio, a proportion of the voice frames according to the quantity of the voice frames in the each call audio and a total quantity of the audio frames in the each call audio; and determine, according to the proportion of the voice frames, the voice activity corresponding to each of the call member terminals.

In some embodiments, the voice analysis module 902 is further configured to divide each of the call audio into more than one audio frames and perform voice detection on each of the audio frames; determine voice frames in the audio frames and determine energy values corresponding to the voice frames; and determine, according to a quantity of valid voice frames with energy values greater than or equal to an energy threshold in the voice frames in each of the call audio, the voice activity corresponding to each of the call member terminals.

In some embodiments, the voice analysis module 902 is further configured to divide each of the call audio into more than one audio frames and calculate respective single-frame signal-to-noise ratios corresponding to the audio frames; perform, for each call audio, weighted summation on the respective single-frame signal-to-noise ratios corresponding to the audio frames in the each call audio, to obtain a voice signal-to-noise ratio corresponding to the each call audio; and use the respective voice signal-to-noise ratios corresponding to the call audio as the voice activity corresponding to the call member terminals.

In some embodiments, the voice analysis module 902 is further configured to divide each of the call audio into more than one audio frames and calculate respective single-frame signal-to-noise ratios corresponding to the audio frames. The determining module 903 is further configured to determine, for each call audio, respective voice adjustment parameters corresponding to the audio frames in the each call audio based on the respective single-frame signal-to-noise ratios corresponding to the audio frames. The mixing processing module 904 is further configured to adjust, for the each call audio, the audio frames in the each call audio according to the respective voice adjustment parameters corresponding to the audio frames, to obtain the adjusted audio corresponding to the call member terminal.

In some embodiments, the determining module 903 is further configured to screen the voice activity corresponding to the call member terminals to obtain a maximum voice activity value; and determine the respective voice adjustment parameters corresponding to the call member terminals according to comparison values between the respective voice activity corresponding to the call member terminals and the maximum voice activity value, the respective voice adjustment parameters corresponding to the call member terminals being negatively correlated with the corresponding comparison values.

In some embodiments, the voice analysis module 902 is further configured to divide, for the respective call audio corresponding to each call member terminal, the corresponding call audio into more than one audio frames located in time domain space; convert the audio frames from the time domain space to frequency domain space to obtain corresponding voice spectra, and determine more than one subbands in each of the respective voice spectra corresponding to the audio frames; for the subbands in each of the audio frames, calculate respective subband power spectra and noise estimation values corresponding to the subbands, and determine respective subband signal-to-noise ratios corresponding to the subbands based on the subband power spectra and the noise estimation values; and calculate the single-frame signal-to-noise ratio corresponding to each of the audio frames according to the respective subband signal-to-noise ratios corresponding to the subbands in each of the audio frames.

In some embodiments, the voice analysis module 902 is further configured to determine, for each subband in each of the audio frames, the subband power spectrum corresponding to the each subband based on frequency domain complex values of frequencies in the each subband; perform smoothing processing on the subband power spectra to obtain corresponding subband smooth power spectra; screen subband smooth power spectra corresponding to subbands with a same subband number in different audio frames to obtain a minimum value as a noise initial value corresponding to the subbands with the corresponding subband number; determine, for the each subband in each of the audio frames, a voice presence probability corresponding to the each subband according to the subband smooth power spectrum and the noise initial value corresponding to the each subband; and determine, for the each subband in each of the audio frames, a noise estimation value corresponding to the each subband according to the voice presence probability and the subband power spectrum corresponding to the each subband.

In some embodiments, the voice analysis module 902 is further configured to determine, for a current subband in a current frame currently processed in the audio frames, a preset quantity of adjacent subbands adjacent to the current subband in the current frame; combine the adjacent subbands and the current subband to form a subband sequence; perform weighted summation, according to weights corresponding to the subband sequence, on the subband power spectra of the subbands in the subband sequence to obtain a frequency domain smooth power spectrum corresponding to the current subband in the current frame; and perform weighted summation on a frequency domain smooth power spectrum of a historical subband corresponding to a same subband number with the current subband in a frame previous to the current frame and the frequency domain smooth power spectrum of the current subband in the current frame, to obtain a subband smooth power spectrum corresponding to the current subband in the current frame.

In some embodiments, the voice analysis module 902 is further configured to: for a current subband in a current frame currently processed in the audio frames, use a quotient of a subband smooth power spectrum and a noise initial value of the current subband as a power ratio corresponding to the current subband in the current frame; use a first value as a voice presence value corresponding to the current subband in the current frame when the power ratio is greater than a preset threshold; use a second value as the voice presence value corresponding to the current subband in the current frame when the power ratio is less than or equal to the preset threshold, the second value being less than the first value; obtain, in a historical frame previous to the current frame, a voice presence probability of a historical subband corresponding to a same subband number with the current subband; and determine a voice presence probability corresponding to the current subband in the current frame according to the voice presence probability corresponding to the historical subband and the voice presence value corresponding to the current subband.

In some embodiments, the voice analysis module 902 is further configured to use differences between a value one and the voice presence probabilities as noise presence probabilities corresponding to the subbands; obtain, for a current subband in a current frame currently processed in the audio frames, a noise estimation value corresponding to a historical subband corresponding to a same subband number with the current subband in a historical frame of the current frame; and sum a first product of the noise estimation value corresponding to the historical subband and the voice presence probability corresponding to the current subband in the current frame and a second product of a subband power spectrum and a noise presence probability corresponding to the current subband in the current frame, to obtain a noise estimation value corresponding to the current subband in the current frame.

In some embodiments, the determining module 903 is further configured to calculate, for a current frame currently processed in the audio frames of the each call audio, a corresponding instant voice adjustment parameter based on a single-frame signal-to-noise ratio corresponding to the current frame; determine a historical voice adjustment parameter corresponding to a historical frame previous to the current frame; determine a voice adjustment parameter corresponding to the current frame according to the historical voice adjustment parameter and the instant voice adjustment parameter corresponding to the current frame; and further process a subsequent frame after the current frame until the respective voice adjustment parameters corresponding to the audio frames are obtained.

In some embodiments, the determining module 903 is further configured to determine a maximum signal-to-noise ratio and a minimum signal-to-noise ratio from the single-frame signal-to-noise ratios corresponding to the audio frames in the each call audio; determine a first difference according to a difference between the maximum signal-to-noise ratio and the minimum signal-to-noise ratio; determine, for the current frame currently processed in the audio frames of the each call audio, a second difference according to a difference between the single-frame signal-to-noise ratio corresponding to the current frame and the minimum signal-to-noise ratio; and determine the instant voice adjustment parameter corresponding to the current frame according to a preset minimum gain value, the first difference, and the second difference.

The foregoing call audio processing apparatus performs voice analysis on the call audio corresponding to the terminals of the call members participating in the call to determine the respective voice activity corresponding to the call member terminals. The voice adjustment parameters of the call member terminals are controlled according to the voice activity, so that the adjusted audio are obtained by adjusting the call audio according to the corresponding voice adjustment parameters, and the mixed audio is obtained by performing mixing processing on the adjusted audio. In this way, by using a voice-activity-based voice modulation mechanism, the interference of ambient noise of an inactive user with an active user during the call can be reduced, so that a call member with low voice activity interferes as little as possible with a call member with relatively high activity, and the overall call effect and quality are improved. Moreover, the number of final participants in mixing is not limited during the mixing processing, to avoid the problem that call members exceeding the number of participants to be selected cannot "produce a voice", thereby furthering improves the call quality effectively.

Figure 10:
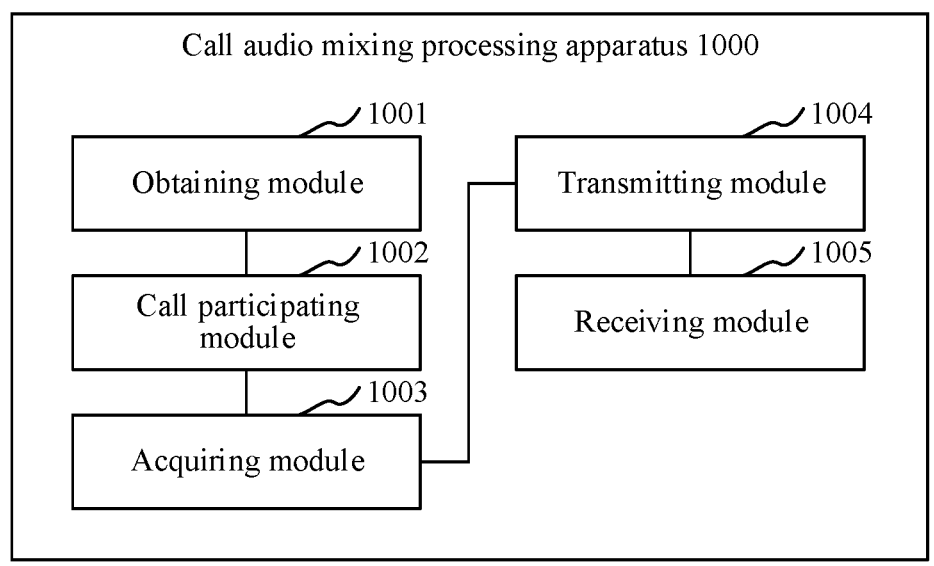
FIG. 10 is an exemplary structural block diagram of a call audio mixing processing apparatus according to another embodiment.

As shown in FIG. 10, in some embodiments, a call audio processing apparatus 1000 is provided, including an obtaining module 1001, a call participating module 1002, an acquiring module 1003, a transmitting module 1004, and a receiving module 1005. One or more modules, submodules, and/or units of the apparatus can be implemented by processing circuitry, software, or a combination thereof, for example.

The obtaining module 1001 is configured to obtain a call creation instruction.

The call participating module 1002 is configured to participate in, according to the call creation instruction, a call created based on the call creation instruction.

The acquiring module 1003 is configured to acquire a call audio generated locally during the call.

The transmitting module 1004 is configured to transmit the call audio to a server, the transmitted call audio being used for instructing the server to perform voice analysis on call audio of terminals of call members participating in the call, determine corresponding voice activity, determine corresponding voice adjustment parameters according to the voice activity, adjust the corresponding call audio according to the respective voice adjustment parameters corresponding to the call member terminals to obtain adjusted audio, and perform mixing processing based on the adjusted audio to obtain a mixed audio, the voice activity being used for reflecting activity levels of the call members participating in the call.

The receiving module 1005 is configured to receive and play the mixed audio fed back by the server.

In some embodiments, the transmitting module 1004 is further configured to perform voice enhancement processing on the call audio, the voice enhancement processing including at least one of voice noise cancellation processing, echo cancellation processing, and voice volume adjustment processing; and transmit the call audio to the server after the voice enhancement processing.

By using the foregoing call audio mixing processing apparatus, the call audio generated by the call members participating in the call are acquired and reported to the server, and the server performs voice analysis on the call audio corresponding to the terminals of the call members participating in the call to determine the respective voice activity corresponding to the call member terminals. The server controls the voice adjustment parameters of the call member terminals according to the voice activity, so as to obtain the adjusted audio by adjusting the call audio according to the corresponding voice adjustment parameters, mix the adjusted audio, and feed back the mixed audio to the call member terminals for playing. In this way, by using a voice-activity-based voice modulation mechanism, the interference of ambient noise of an inactive user with an active user during the call can be reduced, so that a call member with low voice activity interferes as little as possible with a call member with relatively high activity, and the overall call effect and quality are improved. Moreover, the number of final participants in mixing is not limited during the mixing processing, to avoid the problem that call members exceeding the number of participants to be selected cannot "produce a voice", thereby furthering improves the call quality effectively.

Figure 11:
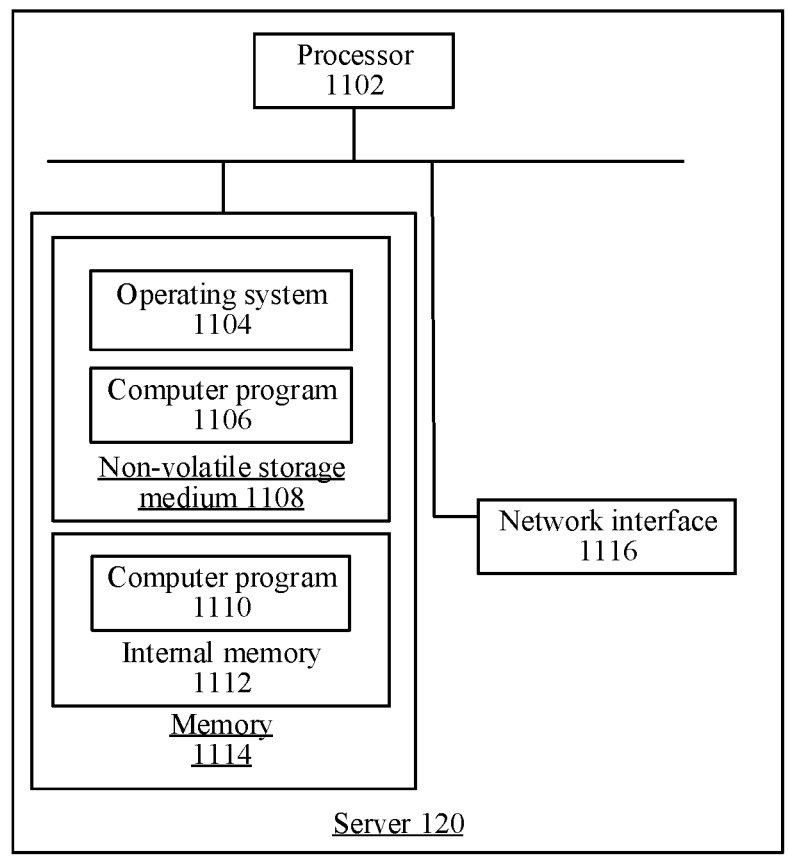
FIG. 11 is an exemplary structural block diagram of a server according to an embodiment.

FIG. 11 is a diagram of an internal structure of a computer device according to an embodiment. The computer device may be specifically the server 120 in FIG. 1. As shown in FIG. 11, the server includes processing circuitry (e.g., a processor 1102), a memory 1114 and a network interface 1116 that are connected by using a system bus. The memory 1114 includes a non-volatile storage medium 1108 and an internal memory 1112. The non-volatile storage medium 1108 of the computer device stores an operating system 1104 and may further store a computer program 1106, the computer program 1106, when executed by the processor 1102, causing the processor 1102 to implement the call audio mixing processing method. The internal memory 1112 may also store a computer program 1110, the computer program 1110, when executed by the processor 1102, may cause the processor 1102 to perform the call audio mixing processing method.

The structure shown in FIG. 11 is only a block diagram of a part of a structure correlated to a solution of this disclosure and does not limit the computer device to which the solution of this disclosure is applied. Specifically, the computer device may include more or fewer members than those in the drawings, or include a combination of some members, or include different member layouts.

Figure 12:
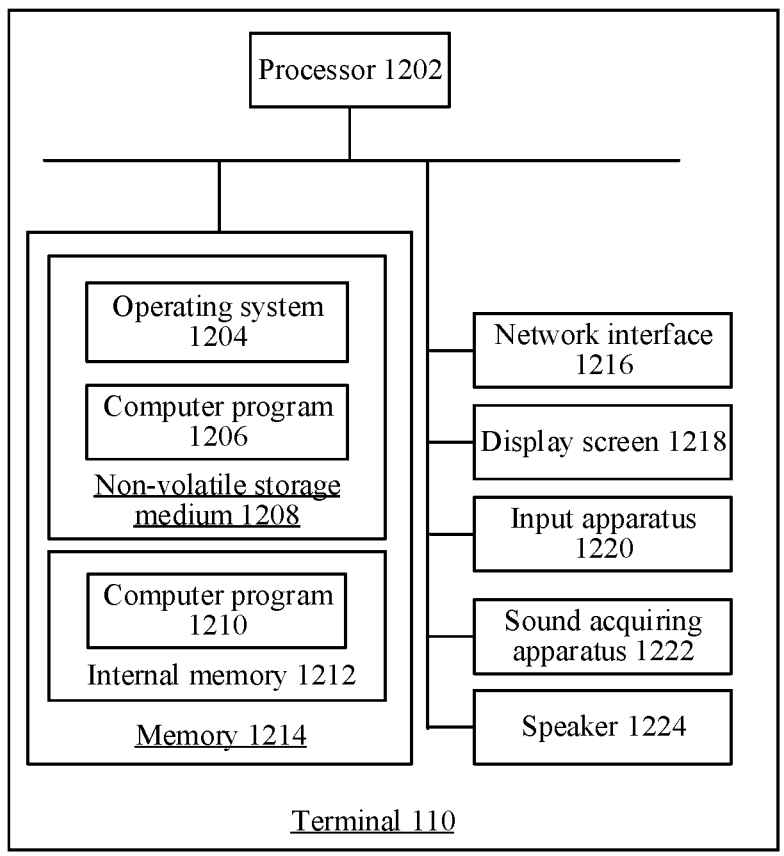
FIG. 12 is an exemplary structural block diagram of a terminal according to an embodiment.

FIG. 12 is a diagram of an internal structure of a computer device according to an embodiment. The computer device may be specifically the terminal 110 in FIG. 1. As shown in FIG. 12, the terminal includes processing circuitry (e.g., a processor 1202), a memory 1214, a network interface 1216, an input apparatus 1220, a display screen 1218, a sound acquiring apparatus 1222, and a speaker 1224 that are connected through a system bus. The memory 1214 includes a non-volatile storage medium 1208 and an internal memory 1212. The non-volatile storage medium 1208 of the computer device stores an operating system 1204 and may further store a computer program 1206, the computer program 1206, when executed by the processor 1202, causing the processor 1202 to implement the call audio mixing processing method. The internal memory 1212 may also store a computer program 1210, the computer program 1210, when executed by the processor 1202, may cause the processor 1202 to perform the call audio mixing processing method. The display screen 1218 of the computer device may be a liquid crystal display screen or an e-ink display screen. The input apparatus 1220 of the computer device may be a touch layer covering the display screen, or a button, a trackball, or a touchpad disposed on a housing of the computer device, or an external keyboard, touchpad, mouse, or the like.

The structure shown in FIG. 12 is only a block diagram of a part of a structure correlated to a solution of this disclosure and does not limit the computer device to which the solution of this disclosure is applied. Specifically, the computer device may include more or fewer members than those in the drawings, or include a combination of some members, or include different member layouts.

In some embodiments, the call audio mixing processing apparatus provided in this disclosure may be implemented in the form of a computer program. The computer program may be run on the computer device shown in FIG. 11 or FIG. 13. A memory of the computer device may store program modules forming the call audio mixing processing apparatus, for example, the obtaining module, the voice analysis module, the determining module, the mixing processing module, and the feedback module shown in FIG. 9. A computer program formed by the program modules causes the processor to perform steps in the call audio mixing processing method in the embodiments of this disclosure described in this specification. For example, the memory may further store the obtaining module, the call participating module, the acquiring module, the transmitting module, and the receiving module shown in FIG. 10.

For example, the computer device shown in FIG. 11 may perform step S202 by using the obtaining module in the call audio mixing processing apparatus shown in FIG. 9. The computer device may perform step S204 by using the voice analysis module. The computer device may perform step S206 by using the determining module. The computer device may perform step S208 by using the mixing processing module. The computer device may perform step S210 by using the feedback module.

For another example, the computer device shown in FIG. 12 may perform step S702 by using the obtaining module in the call audio mixing processing apparatus shown in FIG. 10. The computer device may perform step S704 by using the call participating module. The computer device may perform step S706 by using the acquiring module. The computer device may perform step S708 by using the transmitting module. The computer device may perform step S710 by using the receiving module.

In some embodiments, a computer device is provided, including a memory and one or more processors, the memory storing computer-readable instructions, the computer-readable instructions, when executed by the one or more processors, causing the one or more processors to perform the steps in the foregoing call audio mixing processing method. The steps in the call audio mixing processing method may be steps in the call audio mixing processing method in the foregoing embodiments.

In some embodiments, one or more non-volatile readable storage media are provided, storing computer-readable instructions, the computer-readable instructions, when executed by one or more processors, causing the one or more processors to perform the steps of the call audio mixing processing method. The steps in the call audio mixing processing method may be steps in the call audio mixing processing method in the foregoing embodiments.

All or some of procedures of the method in the foregoing embodiments may be implemented by a computer program instructing relevant hardware. The program may be stored in a non-transitory computer-readable storage medium, such as a non-volatile computer-readable storage medium. When the program is executed, the procedures of the foregoing method embodiments may be implemented. References to the memory, the storage, the database, or other media used in the embodiments provided in this disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be acquired in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct rambus dynamic RAM (DRDRAM), and a rambus dynamic RAM (RDRAM).

Technical features of the foregoing embodiments may be combined in various manners. For conciseness, not all possible combinations of the technical features in the foregoing embodiments are described. However, the combinations of these technical features shall be considered as falling within the scope of this disclosure.

The foregoing embodiments show only several implementations of this disclosure and are described in detail, which, however, are not to be construed as a limitation to the patent scope of this disclosure. It should be noted that transformations and improvements can be made without departing from the idea of this disclosure. These transformations and improvements fall within the scope of this disclosure.

What is claimed is:

1. A call audio mixing processing method, comprising:
obtaining call audio streams from terminals of call members participating in a call;
performing voice analysis on the call audio streams to determine voice activity corresponding to each of the terminals, the voice activity of the terminals indicating activity levels of the call members participating in the call;
determining, according to the voice activity of the terminals, respective voice adjustment parameters corresponding to the terminals;
adjusting, by processing circuitry according to the respective voice adjustment parameters corresponding to the terminals, the call audio streams of the terminals; and
performing mixing processing on the adjusted call audio streams to obtain a mixed audio stream, wherein
the call audio streams are divided into audio frames, and
the voice analysis performed on a call audio stream of the call audio streams is based on (i) a minimum value of a plurality of subband power spectra of a same subband in the audio frames of the call audio stream and (ii) a voice presence probability for the same subband in each of the audio frames of the call audio stream, the voice presence probability for the same subband in the respective audio frame being determined according to the one of the plurality of subband power spectra of the same subband in the respective audio frame and the minimum value of the plurality of subband power spectra of the same subband.

2. The method according to claim 1, wherein the obtaining the call audio streams comprises:
receiving encoded audio data streams from the terminals of the call members participating in the call, each of the encoded audio data streams being encoded based on a terminal performance of a terminal of the terminals that corresponds to the respective encoded audio data stream; and
decoding the encoded audio data streams from the terminals to obtain the call audio streams from the terminals.

3. The method according to claim 2, further comprising:
encoding the mixed audio stream based on the terminal performance of the terminals, to obtain mixed encoded voices for the terminals based on the terminal performance of the terminals; and
transmitting the mixed encoded voices to the terminals.

4. The method according to claim 1, wherein the performing the voice analysis comprises:
for each of the call audio streams,
dividing the respective call audio stream into the audio frames and performing voice detection on the audio frames;
determining a quantity of voice frames in the audio frames in the respective call audio stream;
determining a proportion of the voice frames according to the quantity of the voice frames in the respective call audio stream and a total quantity of the audio frames in the respective call audio stream; and
determining, according to the proportion of the voice frames, the voice activity of the terminal corresponding to the respective call audio stream.

5. The method according to claim 1, wherein the performing the voice analysis comprises:
for each of the call audio streams,
dividing the respective call audio stream into the audio frames and performing voice detection on the audio frames;
determining voice frames in the audio frames and determining energy values of the voice frames; and
determining the voice activity of the terminal corresponding to the respective call audio stream according to a quantity of valid voice frames with energy values greater than or equal to an energy threshold among the voice frames in the respective call audio stream.

6. The method according to claim 1, wherein the performing the voice analysis comprises:
for each of the call audio streams,
dividing the call audio stream into the audio frames and calculating respective single-frame signal-to-noise ratios of the audio frames; and
performing weighted summation on the respective single-frame signal-to-noise ratios of the audio frames in the respective call audio stream, to obtain a voice signal-to-noise ratio of the respective call audio stream, wherein
the voice activity of the terminals corresponds to the voice signal-to-noise ratios of the call audio streams.

7. The method according to claim 6, wherein the dividing comprises:
dividing, the respective call audio stream into the audio frames in a time domain space;
converting the audio frames from the time domain space to a frequency domain space to obtain corresponding voice spectra;
determining subbands in each of the respective voice spectra of the audio frames;
calculating, for the subbands in each of the audio frames, subband power spectra and noise estimation values corresponding to the subbands;
determining, based on the subband power spectra and the noise estimation values, respective subband signal-to-noise ratios of the subbands; and
calculating the single-frame signal-to-noise ratio of each of the audio frames according to the respective subband signal-to-noise ratios of the subbands in each of the audio frames.

8. The method according to claim 7, wherein the calculating, for the subbands in each of the audio frames, the subband power spectra and the noise estimation values corresponding to the subbands comprises:
determining, for each subband in each of the audio frames, the subband power spectrum of the respective subband based on frequency domain complex values of frequencies in the respective subband;
performing smoothing processing on the subband power spectra to obtain corresponding subband smooth power spectra;
determining a minimum value of subband smooth power spectra of subbands with a same subband number in different audio frames as a noise initial value corresponding to the subbands with the corresponding subband number;

determining, for each subband in each of the audio frames, a voice presence probability corresponding to the respective subband according to the subband smooth power spectrum and the noise initial value corresponding to the respective subband; and determining, for each subband in each of the audio frames, a noise estimation value of the respective subband according to the voice presence probability and the subband power spectrum of the respective subband.

9. The method according to claim 8, wherein the performing the smoothing processing comprises:

determining, for a current subband in a current frame currently processed in the audio frames, a preset quantity of adjacent subbands adjacent to the current subband in the current frame;

combining the adjacent subbands and the current subband to form a subband sequence;

performing weighted summation on the power spectra of the subbands in the subband sequence according to weights corresponding to the subband sequence, to obtain a frequency domain smooth power spectrum of the current subband in the current frame; and performing weighted summation on a frequency domain smooth power spectrum of a historical subband corresponding to a same subband number with the current subband in a frame preceding the current frame and the frequency domain smooth power spectrum of the current subband in the current frame, to obtain a subband smooth power spectrum of the current subband in the current frame.

10. The method according to claim 8, wherein the determining, for each subband in each of the audio frames, the voice presence probability comprises:

using, for a current subband in a current frame currently processed in the audio frames, a quotient of a subband smooth power spectrum and a noise initial value of the current subband as a power ratio of the current subband in the current frame;

using a first value as a voice presence value corresponding to the current subband in the current frame when the power ratio is greater than a preset threshold;

using a second value as the voice presence value corresponding to the current subband in the current frame when the power ratio is less than or equal to the preset threshold, the second value being less than the first value;

obtaining, in a historical frame previous to the current frame, a voice presence probability of a historical subband corresponding to a same subband number with the current subband; and determining a voice presence probability corresponding to the current subband in the current frame according to the voice presence probability corresponding to the historical subband and the voice presence value corresponding to the current subband.

11. The method according to claim 8, wherein the determining, for each subband in each of the audio frames, the noise estimation value comprises:

using a difference between a value one and the voice presence probability as a noise presence probability corresponding to the respective subband;

obtaining, for a current subband in a current frame currently processed in the audio frames, a noise estimation value corresponding to a historical subband with a same subband number as the current subband in a historical frame of the current frame; and summing a first product of the noise estimation value corresponding to the historical subband and the voice presence probability corresponding to the current subband in the current frame and a second product of the subband power spectrum and the noise presence probability corresponding to the current subband in the current frame, to obtain the noise estimation value corresponding to the current subband in the current frame.

12. The method according to claim 1, wherein the performing the voice analysis comprises:

dividing each of the call audio streams into the audio frames and calculating respective single-frame signal-to-noise ratios of the audio frames;

the determining includes determining, for each of the call audio streams, respective voice adjustment parameters corresponding to the audio frames in the respective call audio stream based on the respective single-frame signal-to-noise ratios of the audio frames in the respective call audio stream; and the adjusting includes adjusting, for each of the call audio streams, the audio frames in the respective call audio stream according to the respective voice adjustment parameters corresponding to the audio frames in the respective call audio stream, to obtain the adjusted call audio streams of the terminals.

13. The method according to claim 12, wherein the determining, for each of the call audio streams, the respective voice adjustment parameters comprises:

calculating, for a current frame currently processed in the audio frames of the respective call audio stream, a corresponding instant voice adjustment parameter based on the single-frame signal-to-noise ratio of the current frame;

determining a historical voice adjustment parameter corresponding to a historical frame preceding the current frame;

determining a voice adjustment parameter corresponding to the current frame according to the historical voice adjustment parameter and the instant voice adjustment parameter corresponding to the current frame; and processing a subsequent frame after the current frame until the respective voice adjustment parameters corresponding to the audio frames are obtained.

14. The method according to claim 13, wherein the calculating the corresponding instant voice adjustment parameter comprises:

determining a maximum signal-to-noise ratio and a minimum signal-to-noise ratio from the single-frame signal-to-noise ratios of the audio frames in the respective call audio stream;

determining a first difference according to a difference between the maximum signal-to-noise ratio and the minimum signal-to-noise ratio;

determining a second difference for the current frame currently processed in the audio frames of the respective call audio stream according to a difference between the single-frame signal-to-noise ratio of the current frame and the minimum signal-to-noise ratio; and determining the instant voice adjustment parameter corresponding to the current frame according to a preset minimum gain value, the first difference, and the second difference.

15. The method according to claim 1, wherein the determining comprises:

obtaining a maximum voice activity value of the voice activity corresponding to the terminals; and determining the respective voice adjustment parameters corresponding to the terminals according to comparison values between the respective voice activity corresponding to the terminals and the maximum voice activity value, the respective voice adjustment parameters corresponding to the terminals being negatively correlated with the corresponding comparison values.

16. A non-transitory computer-readable storage medium storing instructions which when executed by one or more processors, cause the one or more processors to perform the method according to claim 1.

17. A call audio mixing processing method, comprising:
obtaining a call creation instruction;
participating in, according to the call creation instruction, a call created based on the call creation instruction;
acquiring a call audio stream generated locally during the call;
transmitting the call audio stream to a server; and
receiving and playing, by processing circuitry, a mixed audio stream from the server, wherein
voice analysis is performed on call audio streams from terminals of call members participating in the call to determine voice activity corresponding to each of the terminals, the voice activity of the terminals indicating activity levels of the call members participating in the call,
the call audio streams of the terminals are adjusted according to respective voice adjustment parameters corresponding to the terminals, the respective voice adjustment parameters corresponding to the terminals being determined based on the voice activity of the terminals, and
the mixed audio stream is generated based on the adjusted call audio streams, wherein
the call audio streams are divided into audio frames, and
the voice analysis performed on the call audio stream of the call audio streams is based on (i) a minimum value of a plurality of subband power spectra of a same subband in the audio frames of the call audio stream and (ii) a voice presence probability for the same subband in each of the audio frames of the call audio stream, the voice presence probability for the same subband in the respective audio frame being determined according to the one of the plurality of subband power spectra of the same subband in the respective audio frame and the minimum value of the plurality of subband power spectra of the same subband.

18. A non-transitory computer-readable storage medium storing instructions which when executed by one or more processors, cause the one or more processors to perform the method according to claim 17.

19. A call audio mixing processing apparatus, comprising: processing circuitry configured to:
obtain call audio streams from terminals of call members participating in a call;
perform voice analysis on the call audio streams to determine voice activity corresponding to each of the terminals, the voice activity of the terminals indicating activity levels of the call members participating in the call;
determine, according to the voice activity of the terminals, respective voice adjustment parameters corresponding to the terminals;
adjust, according to the respective voice adjustment parameters corresponding to the terminals, the call audio streams of the terminals; and
perform mixing processing on the adjusted call audio streams to obtain a mixed audio stream, wherein
the call audio streams are divided into audio frames, and
the voice analysis performed on a call audio stream of the call audio streams is based on (i) a minimum value of a plurality of subband power spectra of a same subband in the audio frames of the call audio stream and (ii) a voice presence probability for the same subband in each of the audio frames of the call audio stream, the voice presence probability for the same subband in the respective audio frame being determined according to the one of the plurality of subband power spectra of the same subband in the respective audio frame and the minimum value of the plurality of subband power spectra of the same subband.

20. The call audio mixing processing apparatus according to claim 19, wherein the processing circuitry is configured to:
for each of the call audio streams,
divide the respective call audio stream into the audio frames and perform voice detection on the audio frames;
determine a quantity of voice frames in the audio frames in the respective call audio stream;
determine a proportion of the voice frames according to the quantity of the voice frames in the respective call audio stream and a total quantity of the audio frames in the respective call audio stream; and
determine, according to the proportion of the voice frames, the voice activity the terminal corresponding to the respective call audio stream.

\* \* \* \* \*